United States Patent [19]
Scott

[11] 3,930,153
[45] Dec. 30, 1975

[54] MEASUREMENT OF SUBSURFACE FORMATION LITHOLOGY, INCLUDING COMPOSITION AND FLUIDS, USING CAPTURE GAMMA SPECTROSCOPY

[75] Inventor: Hubert D. Scott, Houston, Tex.

[73] Assignee: Texaco Inc., New York, N.Y.

[22] Filed: Dec. 12, 1974

[21] Appl. No.: 531,939

[52] U.S. Cl. .............................. 250/270; 250/262
[51] Int. Cl.² ........................................... G01V 5/00
[58] Field of Search ........................... 250/262, 270

[56] References Cited
UNITED STATES PATENTS
3,739,171    6/1973    Scott .................................. 250/270

Primary Examiner—Harold A. Dixon
Attorney, Agent, or Firm—Thomas H. Whaley; Carl G. Ries; William J. Beard

[57] ABSTRACT

Gamma ray spectra of earth formations surrounding an open or cased well borehole are obtained by exciting subsurface formation elements around the borehole with neutrons and detecting the gamma ray resulting from capture in the subsurface formation of thermalized neutrons from a capture gamma spectroscopy (C.G.S.) well log source. The spectra of gamma rays so obtained are analyzed to form logs of the elements which contribute significantly to the spectra. From these logs, quantitative measurements of the primary formation parameters of formation water salinity, water saturation, porosity, major matrix components and ratios of formation constituents of the earth formations are obtained.

52 Claims, 7 Drawing Figures

MEASUREMENT OF SUBSURFACE FORMATION LITHOLOGY, INCLUDING COMPOSITION AND FLUIDS, USING CAPTURE GAMMA SPECTROSCOPY

BACKGROUND OF THE INVENTION

1. Field of Invention

The present invention relates to measurement of subsurface formation and formation fluid parameters of earth formations surrounding a well borehole using radioactivity well logging.

2. Description of Prior Art

It is well known that nuclei of earth materials surrounding a well borehole may be excited by the capture of neutrons emitted from a well tool in the borehole. Such an excited nucleus may then return to a lower energy level state, emitting gamma radiation in the process. The emitted radiation may also be detected by a well tool in the borehole.

It is also known that, if the energy spectra of gamma rays emitted by elements in the materials surrounding the wellbore could be determined accurately, such spectra would be indicative of the particular combinations of elements which emitted the gamma rays. Accordingly, it has been proposed in the prior art to determine the constituency of earth formations surrounding a wellbore by obtaining at least portions of the energy spectra of the gamma radiation emitted by the materials surrounding the wellbore both by the naturally occurring gamma radiation and the gamma radiation resulting from the bombardment of the materials surrounding the wellbore by neutrons.

In addition to a qualitative determination of the elements comprising the formation materials surrounding the borehole it is highly desirable to be able to attach a quantitative significance to the appearance of each of these elements, if possible. For example, certain anomalous log interpretations can result in open-hole well logging portions of the well which appear to have porous characteristics. These portions of the well may be contaminated by impurities which mask their true nature. Such formations as shaly sands or fresh water filled limestones are difficult to discern compared to clean or uncontaminated oil sands. In such formations, and particularly in cased or previously completed well boreholes, nuclear well logging tools which irradiate the earth formations with penetrating neutron or gamma radiation are often the only means of determining the characteristics of the earth formations behind the casing. It is therefore highly desirable that gamma ray energy spectra of either open or cased boreholes and resulting either from naturally occurring gamma radiation or from induced gamma radiation be recordable and analyzable in a quantitative sense.

Gamma ray energy spectra may be obtained by passing a well logging tool having a proportional detector through the borehole and separating the output of the detector as a function of energy. A proportional detector such as a scintillation counter is typically used for this purpose. A scintillation counter adapted for borehole use typically will contain a scintillating material such as thallium doped sodium iodide or cesium iodide or the like which, when exposed to gamma radiation, will emit flashes of light which are proportional in intensity to the energy of the exciting radiation. These light flashes within the scintillation crystal are then coupled to a photomultiplier tube or other equivalent light detection electronics which produces electrical pulses whose height generally is proportional to the intensity of the light emitted by the scintillation crystal.

The pulses representative of gamma rays having a particular energy represented by the pulse height are then generally processed as, for example, by a pulse height analyzer which sorts the pulses according to their height and accumulates in a number of storage devices, or channels, the number of pulses of a given height which occur. By applying successive pulses produced by the electronic circuitry of the borehole tool to the pulse height analyzer a spectrum of the gamma ray energy of substances in and around the borehole may be obtained. The number of counts occurring in a certain channel is plotted against the channel number (or energy level) of the analyzer channel in question. As many as one thousand or more such analyzer channels may be used to obtain gamma ray spectra in this manner.

In the prior art, it has been known to visually compare gamma ray energy spectra of standard materials made with the same instrument with gamma ray spectra of unknown formations obtained from a well borehole. In the past, this visual comparison has largely been qualitative because of imprecisions in logging tools and associated electronics.

In certain prior art, such as in U.S. Pat. No. 3,739,171, of which applicant is inventor, gamma ray energy spectra of unknown borehole materials were obtained from a pulsed neutron source and were compared with a composite spectrum formed from a weighted mixture of standard spectra. An optimized comparison between the composite spectra and the unknwon spectra was obtained, but it was often difficult to determine directly from the comparison results the lithology of the formations around the borehole, such as volume fractions of the rocks in the formation matrix, porosity, formation water salinity and formation water saturation.

Further, so far as is known, the other remaining alternatives in current practice in radioactive well logging have attempted, with varying degrees of success, to determine formation lithology adjacent boreholes by the use of multiple borehole measurements using multiple types of logging tools, requiring time consuming and expensive separate runs of the multiple tools through the borehole.

SUMMARY OF INVENTION

Briefly, the present invention provides a new and improved method for measuring and determining subsurface formation lithology, including formation matrix constituent fractions, salinity of formation water, porosity, and water saturation of subsurface formations.

A pulsed neutron source and proportional detector are used in a logging tool in the borehole to obtain capture gamma ray spectra of the earth formations surrounding the borehole. From these formation gamma ray spectra, element gamma ray spectra of component elements postulated to be in the formation surrounding the well borehole are derived by performing a least-squares fit and minimizing the squares of the differences between the formation gamma ray spectra and standard spectra of the elements postulated to be in the borehole.

From the element gamma ray spectra, formation lithology of the earth formations, including formation matrix constituent fractions, salinity of formation water, porosity and water saturation of subsurface formations are derived.

Formation gamma ray spectra are obtained from plural depths in the borehole, and from these formation gamma ray spectra, element gamma ray spectra are derived for the plural depths, from which formation lithology is derived for each of the plural depths. An interval at a selected depth in the borehole is chosen as water saturated based on the lithology derived. Using the characteristics at the selected depth, modified values of water saturation, salinity and porosity for the other depths of the borehole are derived. A record is then formed of the lithology derived as a function of borehole depth.

The derivation of element gamma ray spectra and formation lithology according to the present invention is in the form of process or sequence of steps for controlling a general purpose digital computer, such as a Control Data Corporation CDC 7600 computer, to provide output data representing formation lithology for presentation in a suitable recorder as a function of borehole depth for further analysis and interpretation by petroleum engineers. When the computer is performing under control of the process steps of the present invention, it is a new and improved automatic data processing machine for determining subsurface formation lithology of earth formations around a well borehole from formation gamma ray spectra obtained by the pulsed neutron source. The process of the present invention is also adapted for performance in a special purpose analog computer or in a "hard-wired" digital circuit, as well.

It is an object of the present invention to provide a new and improved method and apparatus for measurement and determination of subsurface formation lithology.

DESCRIPTION OF PREFERRED EMBODIMENT

Figure 1:
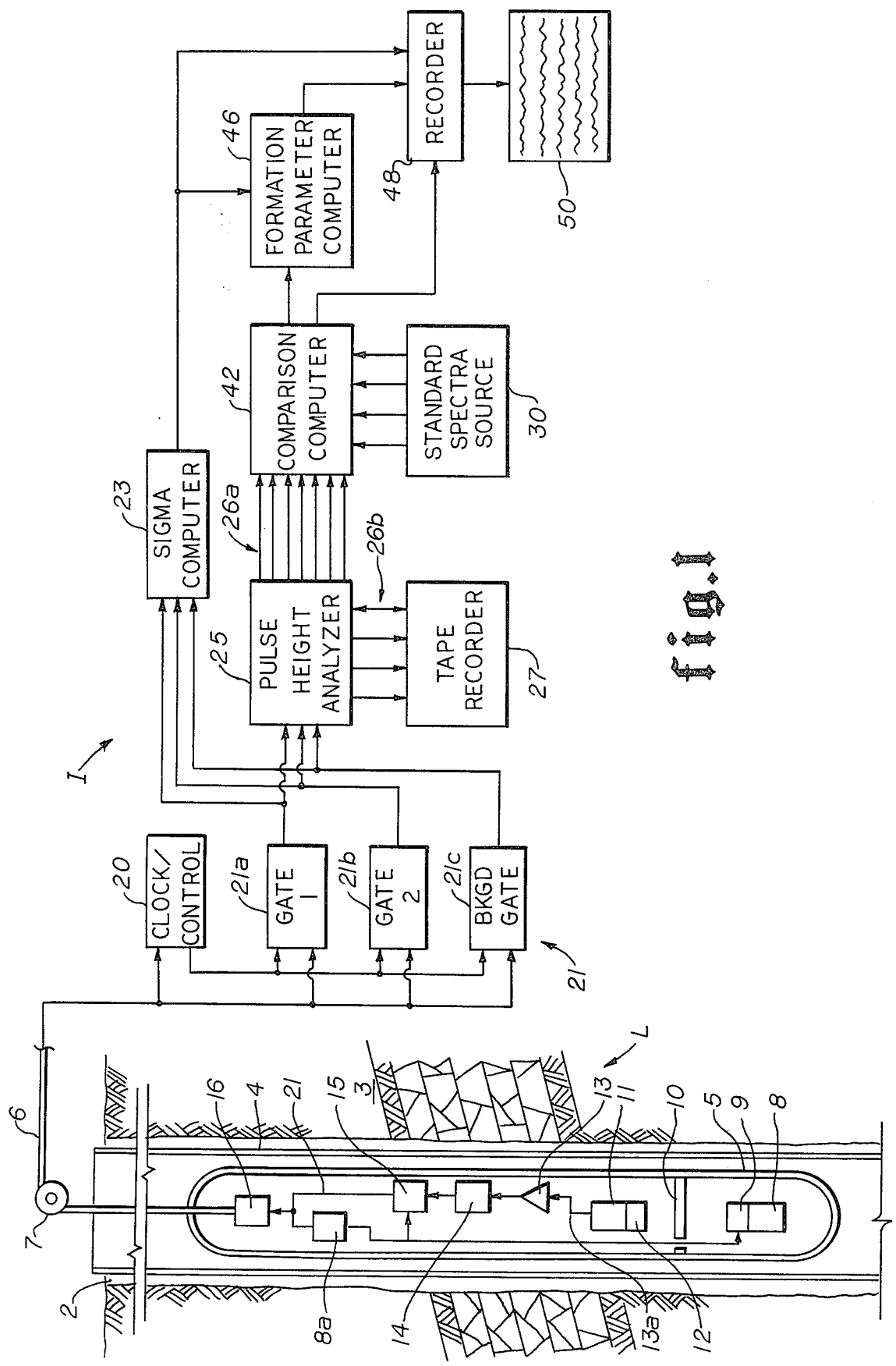
FIG. 1 is a schematic block diagram of a well logging system according to the present invention.

In FIG. 1, the apparatus of the present invention is shown in a borehole 2 in an earth formation 3. The formation 3 is lined in a conventional manner with a steel casing 4 or the like. A well logging system L adapted to examine and investigate preselected characteristics of the earth formations 3 is shown in the borehole 2. In the present invention, as will be set forth below, the well logging system denoted generally as L measures and determines subsurface formation lithology of the earth formations 3 surrounding the borehole 2. For the purposes of the present invention, lithology is defined as the nature, characteristics and constituency of the various layers of subsurface strata, and fluids therein, in the earth formation 3.

Considering the logging system L more in detail, an elongated, fluid tight hollow body member or sonde 5 is adapted to be passed longitudinally through the casing 4. Instrumentation apparatus denoted generally as I is located at the surface for processing and recording electrical measurements, obtained in a manner to be set forth below, provided by the sonde 5. A logging cable 6 is passed over a sheave wheel 7 to support the sonde 5 in the borehole 2. The cables 6 may have one or more conductors for transmitting electrical signals formed in the sonde 5 to the surface equipment I.

The sonde 5 contains a source 8 of high energy neutrons. The neutron source preferred for use in the present invention comprises a deuterium-tritium reaction accelerator, but it should be understood that the present invention is not limited thereto, and that other well logging neutron sources may be used as well, such as americiumberyllium, actinium $^{227}$-beryllium, and californium $^{252}$. In accordance with the present invention, the neutron source 11 is activated, in a manner to set forth below, to emit neutron pulses of a pre-determined interval, so that the earth formations 3 are irradiated intermittently by the source 11.

A radiation detector 12 for detecting capture gamma rays resulting from bombardment of the earth formation 3 surrounding the borehole 2 is illustrated schematically in the drawings. The detector 12 may be a sodium iodide, cesium iodide or other suitable crystal or the like which has an optical output in response to gamma rays sensed. The optical signal output from detector 12 is furnished to a photomultiplier tube 11 of suitable construction. A radiation shield 10 of suitable composition, such as a combination of lead, iron, lucite plastic or other high hydrogen content material or the like is preferably interposed between the accelerator 8 and the crystal 12 to prevent or substantially reduce direct irradiation of the detector 12 as a result of the emission of neutrons from the accelerator 8.

As is conventional, the detector 12 produces a scintillation or discrete flash of light whenever a gamma ray passes therethrough. The photomultiplier tube 11 generates a voltage pulse proportional to the intensity of each such scintillation occurring in the crystal detector 12. The intensity of the scintillations from the detector 8 is functionally related to the energy of the gamma ray, and thus each voltage pulse generated by the tube 11 has an amplitude functionally related to the energy of the corresponding gamma ray sensed in the detector 12. A linear amplifier 13 is electrically connected by a conductor 13a to the photomultiplier tube 11 to amplify the electrical signal output therefrom. A conventional discriminator or bias level circuit 14 may be connected if desired to the amplifier 13 in order to reduce spurious scintillations due to neutron activation of the iodine in scintillator 12 by stray neutrons from the accelerator 8.

Figure 5:
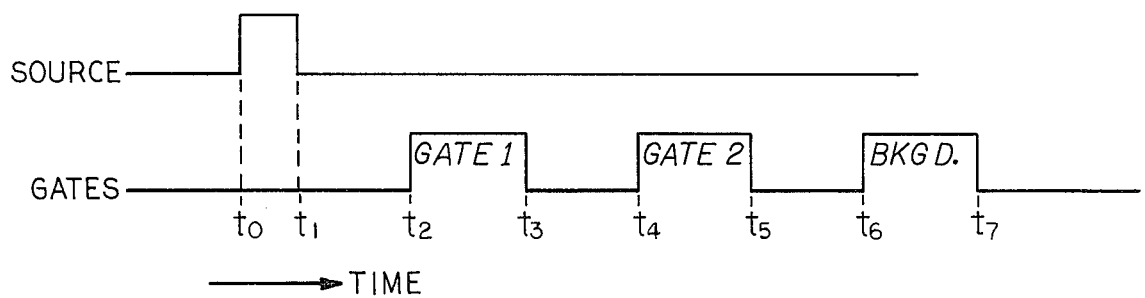
FIG. 5 is a timing diagram representing the relative time occurrence of neutron emission times and measurement time gates of gamma ray spectra according to the present invention.

The accelerator 8 is connected to a pulsing circuit 9, of conventional design, which is activated periodically by a gating circuit 8a to cause the source 8 to emit a neutron pulse of neutrons of a specified time duration at a predetermined interval. The pulse of neutrons emitted by the accelerator 8 in response to the pulsing circuit 9 and gating circuit 8a irradiate the earth formation 3 intermittently with neutron pulses of a duration $t_1$ (FIG. 5) of typically twenty microseconds at a frequency of from 500 to 1000 times per second.

An amplifier 15 receives the output from discriminator 14 and is electrically coupled by a conductor 21 to a cable driver amplifier 16. In this manner, the output signals from the discriminator 14, having spurious signals therein substantially reduced, are permitted to pass through the cable 6 to the surface instrumentation I. In this manner, the capture gamma ray response of the earth formation 3 to the pulsed neutrons from the accelerator 8 may be measured at selected time intervals, in a manner to be set forth, relative to the emission of the neutrons from the source 11. Cable driving circuit 16 is of conventional structure and function, and provides power to transmit the response from the discriminator circuit 14 to the surface instrumentation I. Further, although not shown in FIG. 1, it will be understood that conventional power supplies are included in the present invention for operating the surface instrumentation I and the circuitry contained in the sonde 5, as well.

The electrical signals from the discriminator 14 are transmitted to the surface instrumentation I through the logging cable 6 to a group of suitable gate or switching circuits 21a, 21b and 21c operating in response to command signals provided by a surface clock control network 20. The gates 21 include a first gate 21a, a second gate 21b and a third gate 21c, identified as Gate 1, Gate 2 and Background Gate, for reasons to be set forth. The surface clock control network 20 is a conventional actuating circuit having suitable conventional circuitry therein to cause the emission of timing pulses and to permit the gates 21 and the gating circuit 8a in the sonde 5 to operate in synchronism. The gates 21 further permit, under control imposed by the clock control network 20, only selected groups of counting pulses, representing radiation detected by the crystal 12 while the accelerator 8 is quiescent, to the remaining signal processing circuits of the instrumentation I to be set forth below. Further details concerning the synchronism of the gates 21 and the downhole gate 8a are set forth in applicant's prior U.S. Pat. No. 3,739,171.

DETERMINATION OF Σ AND ELEMENT GAMMA RAY SPECTRA

The gates 21 are individually activated at three distinct times by the clock control network 20 to permit readings of the thermal neutron capture γ ray population to be made at these times. The first gate 21a, or Gate 1, is activated at a time $t_2$ (FIG. 5) sufficiently long after the emission of neutron bursts from the source 11 to permit the rapid absorption effect of borehole materials to die away and to permit the emitted neutrons to reach thermal energy levels before a reading is taken. A typical time $t_2$ is on the order of 400 microseconds after the emission of neutrons from the source 11. The gate 21a is typically activated for a time interval of approximately 200 microseconds.

The gate 21b, or Gate 2 (FIG. 5), is activated by clock control network 20 approximately 300 microseconds after Gate 1 is activated, and is held open for a time interval of approximately 200 microseconds. The third gate 21c, or Background Gate (FIG. 5), is activated at a time $t_6$ sufficiently long after the emission of each neutron burst to permit the thermal neutrons to be substantially all absorbed so that the only radiation present from the formation and the tool is residual or background radiation.

The output signals from the gates 21 are in the form of a sequence of count pulses representing the gamma rays detected by the scintillator crystal 12 during the respective active time intervals of each of the gates 21.

Figure 7:
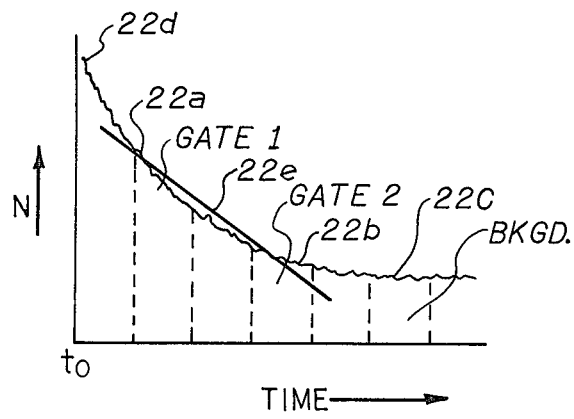
FIG. 7 is a diagram of total gamma ray counts, displayed on a logarithmic scale as a function of time.

A display curve 22 (FIG. 7) illustrates a typical plot of the number of gamma rays, displayed logarithmically, present in the borehole 3 as a function of time. The origin time for the display curve 22 occurs at the same time as the time $t_0$ (FIG. 5) when the emission of neutrons from the source 11 begins.

A portion 22a of the curve 22 typifies the number of gamma rays sensed by the detector 8 during the time that Gate 1, or the first gate 21a, is activated by the control network 21. Similarly, portions 22b and 22c of the curve 22 typify the number of gamma rays sensed by the detector 8 during the time that gates 21b (Gate 2) and 21c (Background Gate) are activated by the control network 20.

As is evident from the curve 22, the number of gamma rays present undergoes an initial period of rapid decrease, as at 22d, due to borehole effects, and thereafter undergoes an exponential decrease due to the capture of neutrons by the nuclei of the elements in the formation 3 until only background or residual radiation is present.

Gate 1, Gate 2 and the Background Gate of the gating network permit timed measurement of the number of gamma rays present at their respective operating times to be furnished to a Sigma computer 23 in order that the macroscopic absorption capture cross-section Σ of the formation 3 may be determined.

The cross-section Σ of the formation is related to the relative exponential rate of decay, or slope, of the curve 22 shown schematically as the line 22e (FIG. 7) in accordance with the following relationship. If N is the number of neutrons present at any time $t$ and $N_0$ is the initial number of neutrons present, then $$N(t) = N_o e^{-t/\tau} \qquad (1)$$

where $$\tau = 1/v\Sigma \qquad (1A)$$

where $v$ is the velocity of the thermal neutrons, 2.2 × 10⁵ cm/sec.

Since the counts during the active cycles of the gates 21 are quantities measured by the detector 8, the Sigma computer 23 can determine the macroscopic capture crosssection Σ. The decay time $\tau$ can be determined using Equations (1) above by measuring the number of gamma rays counted during Gate 1 and Gate 2 over a specific time interval, taking into account the residual radioactivity sensed during open or active time of the Background Gate 21c. Rearranging Equation (1) above, and using the counts Gate 1, Gate 2 and BKGD sensed during operation of the gates 21, the crosssection Σ of the formation 3 can be expressed as:

$$\Sigma = \frac{\ln\left[\dfrac{\text{GATE 1} - \text{BKGD}}{\text{GATE 2} - \text{BKGD}}\right]}{v \cdot (t_4 - t_2)} \qquad (2)$$

where the counts Gate 1 and Gate 2 and Background (BKGD for brevity) Gate are measured during the operation of gates 21a, 21b and 21c and are plotted as logarithmic functions, as has been set forth.

The times $t_2$ and $t_4$ are in microseconds, and the velocity $v$ is in centimeters per second, and it is usually convenient to express the cross-section Σ in "capture units," abbreviated as c.u., of cm²/cm³, or cm⁻¹. Introducing actual values in Equation 2 for $v$, $t_4$ and $t_2$ and adjusting for the logarithmic functions and units, the capture cross-section Σ can be expressed as follows:

$$\Sigma = 15.15 \ln \frac{[\text{Gate 1} - \text{BKGD}]}{[\text{Gate 2} - \text{BKGD}]} \text{c.u.} \quad (3)$$

The Sigma computer 23 determines the cross-section Σ of the formation 3 from gates 21 in accordance with Equation (3).

Figure 6:
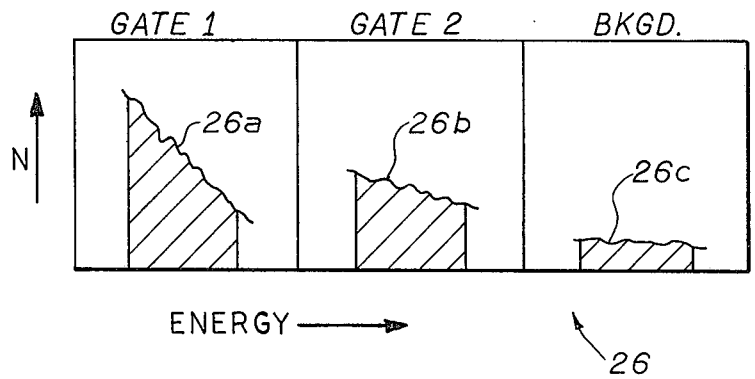
FIG. 6 is a diagram of capture gamma ray counts as a function of their energy levels during the measurement time gates of FIG. 5.

The output signals from the gates 21 are also provided to a pulse height analyzer 25 which sorts and accumulates a running total of the incoming pulses into a plurality of memory storage locations or channels, based on the height or amplitude of the incoming pulses, for each of the gates 21. The pulse height analyzer 25 forms a cumulative record of the number of pulses occurring at each Mev energy level or channel. A display 26 (FIG. 6) indicates typical gamma ray spectra as a function of Mev energy for each of the gates 21. Curves 26a, 26b and 26c illustrate gamma ray spectra, or pulse counts as a function of Mev level, for the gates 21a, 21b and 21c, respectively. The pulse height analyzer 25 provides the stored record of the pulses at the various energy levels for the gates 21 over a plurality of electrical conductors 26a to a comparison computer 42, where such energy levels are compared, in a manner to be set forth below, with a weighted plurality of standard gamma ray spectra from a standard spectra source 30.

The comparison computer 42 performs a comparison to determine the constituency by chemical element of the earth formation 3 surrounding the borehole 2 at the depth of the sonde 5. Additionally, if desired, the output from the pulse height analyzer 25 may be electrically supplied over plural conductors 26b to a suitable recording apparatus 27, such as a tape recorder, and stored therein in suitable format as a function of borehole depth of the sonde 5. The signals stored in the tape recorder 27 may then be displayed in the conventional manner and compared with the other data at a later time, if desired.

Figure 2:
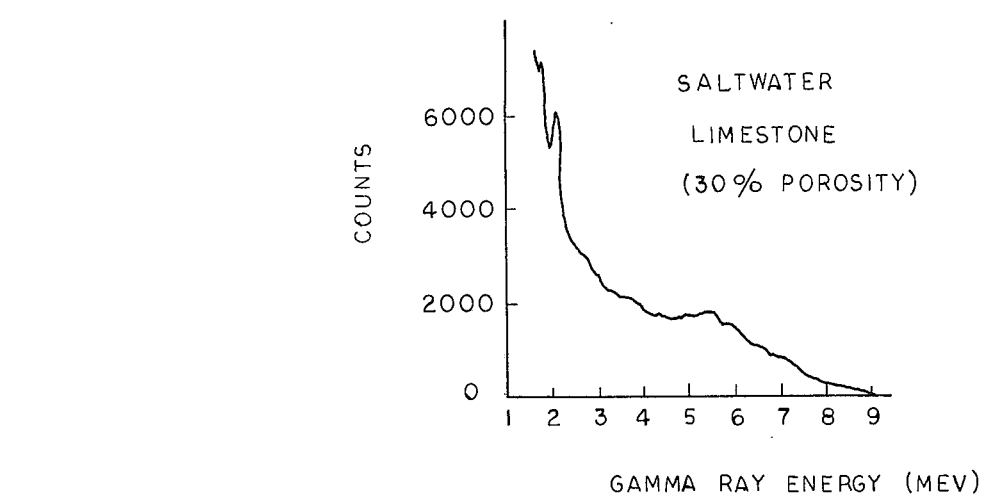
FIG. 2 is a graphical illustration of an example of gamma ray spectrum and of element gamma ray spectra obtained from a wellbore according to the present invention.
Figure 2:
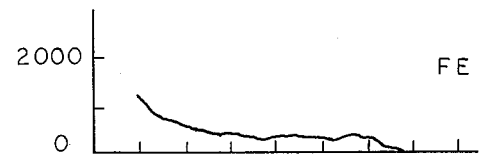
Figure 2:
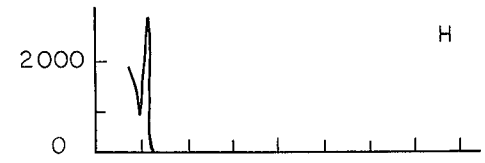
Figure 2:
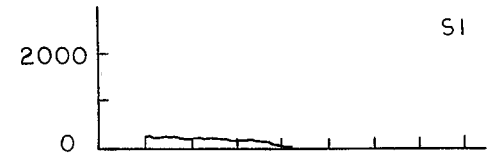
Figure 2:
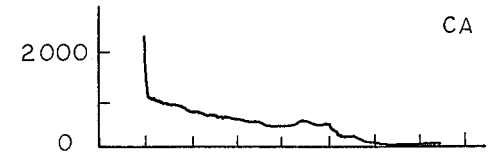
Figure 2:
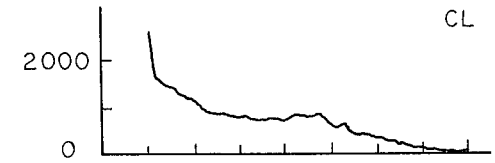

The comparison computer 42 sums the gamma ray spectra from the time gates 21a, 21b and 21c to form therefrom a formation gamma ray spectrum. The comparison computer 42 further compares the formation gamma ray energy spectrum, such as that shown in FIGS. 2 and 6, of the formation surrounding the borehole at each depth to form therefrom element gamma ray spectra as a function of borehole depth indicating the relative presence of hydrogen, silicon, iron, calcium, chlorine, sulfur, aluminum, magnesium or other materials postulated to be in the formation surrounding the borehole. The comparison computer 42 performs a least-squares fit analysis to minimize the squares of the differences between the formation gamma ray spectra from the pulse height analyzer 25 and the standard spectra from the source 30 taken in composite weighted groups to obtain the best fit of the composite weighted spectra with the formation spectra. A suitable method for operating the comparison computer 42 is set forth in detail in U.S. Pat. No. 3,739,171, which is incorporated herein by reference.

It is thus important to note that in accordance with the present invention both the cross-section Σ and the element gamma ray spectra are determined. Further, it is to be noted that the determination of the cross-section Σ in the Sigma computer 23 and the element gamma ray spectra in comparison computer 42 take place simultaneously. Determination of these quantities, in this manner, according to the present invention permits determination and quantitative measurement of the formation lithology, including volume fractions of the rocks in the formation matrix, porosity, formation water salinity and formation water saturation, in a manner to be set forth.

DERIVATION OF EXPRESSIONS FOR DEFINING AND DETERMINING FORMATION PARAMETERS

As has been set forth above, the well borehole 2 is cased by casing 4. The formation 3 typically contains a mixture of sandstone, limestone, dolomite, anhydrite or gypsum, and shale. Also, the water in formation 3 has a certain salinity S, the water in borehole 2 has a salinity $S_B$, the formation 3 has a thermal neutron capture cross-section Σ and a porosity $\phi$.

The least squares fit analysis computer 42 allows expression of the total gamma ray counts γ detected in a range, such as 2 to 8 Mev, to be made in terms of the yield $\gamma_i$ from each element $i$ contributing, according to an equation:

$$\gamma = \gamma_{Fe} + \gamma_{Si} + \gamma_{Ca} + \gamma_{Mg} + \gamma_{S} + \gamma_{Al} + \gamma_{Cl} + \gamma_{H} \quad (4)$$

The occurrence of the gamma rays forming the total gamma ray counts γ takes place over a period of time after each pulsed emission of a finite number $N_o$ of neutrons from the source 8.

Further, the cross-section Σ of the formation 3 is made up from the sum of the values of Σ for each element in the formation including $\Sigma_X$ for elements which do not contribute gamma rays to the spectrum (for example, boron), which can be expressed as:

$$\Sigma = \Sigma_{Si} + \Sigma_{Ca} + \Sigma_{Mg} + \Sigma_{S} + \Sigma_{Al} + \Sigma_{Cl} + \Sigma_{H} + \Sigma_X \quad (5)$$

COMPENSATING FUNCTION $f(\Sigma)$

However, although the gamma ray counts γ and the gamma ray yields, or element gamma ray spectra, are readily determined in the comparison computer 42, it does not follow that Σ for each element may readily be determined from the element gamma ray spectra alone.

With the present invention, it has been found that allowance or compensation must be made in the count rates for the time dependence of the number of neutrons present in the formation at a particular time after emission.

Accordingly, with the present invention, a compensating function $f(\Sigma)$ which modulates the yield of gamma rays produced per unit time based on the cross-section Σ of the formation is used. The compensating function $f(\Sigma)$ defines and takes into account the time dependence of the actual gamma ray count γ upon the capture cross-section Σ. For example, in a formation having salt water, and thus a high value for Σ, a relatively short time will elapse before all of the neutrons emitted by the source 8 are captured. Conversely, where the formation contains fresh water or oil, and thus has a relatively low Σ value, the number of neutrons available per unit time is higher. The compensating function $f(\Sigma)$ provides a normalizing effect on the number of thermal neutrons available per unit time for capture by the formation elements.

Thus, with the present invention, the compensating function $f(\Sigma)$ permits simultaneous use of time-dependent and energy-dependent gamma ray energy data, and computations can be made using these data to determine directly therefrom quantitative measurements of formation volume fractions, formation water saturation $S_w$, formation water salinity S, and porosity $\phi$.

In order to determine the compensation function $f(\Sigma)$, it is helpful to first consider a pulse of fast neutrons produced or emitted at a rate $N_{of}$ (number/second) for an infinitesimal amount of time, $\delta t$, (seconds). These fast neutrons are converted by the moderation process to slow neutrons, as follows:

$$N_f(t) = N_{of}\delta t \, e^{-\lambda_1 t} \qquad (6)$$

defining the number $N_f(t)$ of fast neutrons present at time $t$, where $\lambda_1$ is the inverse of $\tau_1$, the moderation time decay constant (sec$^{-1}$).

The number of slow neutrons $N_s(t)$ and their rate of formation are related to $N_f(t)$ in the following manner:

$$\frac{dN_s(t)}{dt} = -\frac{dN_f(t)}{dt} - \lambda N_s(t) \qquad (7)$$

where $\lambda$ is the inverse of $\tau$, the absorption time decay constant (sec$^{-1}$).

Taking the time derivative of the expression of Equation (6) and substituting this expression into Equation (7) yields:

$$\frac{dN_s(t)}{dt} = \lambda_1 N_{of}\delta t \, e^{-\lambda_1 t} - \lambda N_s(t) \qquad (8)$$

Taking the time integral of Equation (8) yields:

$$N_s(t) = \frac{\lambda_1}{\lambda - \lambda_1} N_{of}\delta t \, (e^{-\lambda_1 t} - e^{-\lambda t}) \qquad (9)$$

However, an actual pulse covers more time than $\delta t$, so to define the number of slow neutrons $N(t)$ existing at time $t$ one must integrate over a pulse. Letting $\Delta t =$ length of pulse, $t$ being measured from the beginning of fast neutron pulse, and for $t \geq \Delta t$, $$N(t) = \int_{t-\Delta t}^{t} \frac{\lambda_1}{\lambda-\lambda_1} N_{of} (e^{-\lambda_1 t} - e^{-\lambda t}) \, dt \qquad (10)$$

which yields:

$$N(t) = \frac{\lambda_1}{\lambda-\lambda_1} N_{of}[-\frac{1}{\lambda_1} e^{-\lambda_1 t}(1-e^{\lambda_1 \Delta t}) + \frac{1}{\lambda} e^{-\lambda t}(1-e^{\lambda \Delta t})] \qquad (11)$$

The decay rate or capture rate of neutrons is proportional to the number of slow neutrons present, i.e., $$\frac{dN}{dt}(t) = -\lambda N(t). \qquad (12)$$

Thus, for a rectangular neutron pulse width of length $t_1$ (FIG. 5), the number of gamma ray pulses $\gamma$ recorded in the time interval $t_2$ to $t_3$ is within a constant factor given by the equation:

$$\gamma(t_2 \to t_3) = \frac{\lambda \lambda_1}{\lambda-\lambda_1} N_{of} \left[\frac{1}{\lambda_1^2}(e^{-\lambda_1 t_3} - e^{-\lambda_1 t_2})(1-e^{\lambda_1 t_1}) - \frac{1}{\lambda^2}(e^{-\lambda t_3} - e^{-\lambda t_2})(1-e^{\lambda t_1})\right] \qquad (13)$$

Rearranging and expressing $\gamma$ in terms of $\tau$ gives:

$$\gamma(t_2 \to t_3) = \frac{N_{of}}{(\tau-\tau_1)} [\tau^2(e^{-\frac{t_2}{\tau}} - e^{-\frac{t_3}{\tau}})(e^{\frac{t_1}{\tau}} - 1) - \tau_1^2(e^{-\frac{t_2}{\tau_1}} - e^{-\frac{t_3}{\tau_1}})(e^{\frac{t_1}{\tau_1}} - 1)] \qquad (14)$$

Typical values of $\tau_1$ range from 25 to 6 $\mu$secs for the porosity range 10 to 40%. Values of $\tau$ are typically about 200 $\mu$secs. Therefore, the second term of Equation (14) is negligible compared with the first term and the equation reduces to:

$$f(\Sigma) = \gamma(t_2 \to t_3) = \frac{N_{of}}{(\tau-\tau_1)} [\tau^2(e^{-\frac{t_2}{\tau}} - e^{-\frac{t_3}{\tau}})(e^{\frac{t_1}{\tau}} - 1)] \qquad (15)$$

defining the number of gamma ray count pulses as a function of times $t_1$, $t_2$ and $t_3$. The application of $f(\Sigma)$ to the count rates compensates for the time dependence of the actual gamma ray count based on formation thermal neutron lifetime $\tau$. Equation (15) defines the compensating function $f(\Sigma)$.

If the neutron burst length $t_1$ is short ($\sim 20 \mu$secs), the term:

$$(e^{\frac{t_1}{\tau}} - 1) \simeq \frac{t_1}{\tau} \qquad (16)$$

and since $\tau \gg \tau_1$, a short burst length approximation can be made:

$$f(\Sigma) = \gamma_{SB}(t_2 \to t_3) = N_{of}(e^{-\frac{t_2}{\tau}} - e^{-\frac{t_3}{\tau}}) \cdot t_1 \qquad (17)$$

If the neutron burst $t_1$ is short, Equation (17) can be used to determine $f(\Sigma)$.

As a further alternative, if the time gates and $t_3$, $t_2$ are respectively at 2 and 3 and the neutron pulse has duration $\tau$ a simplified equation of the type:

$$f(\Sigma) = \gamma(t_2 \to t_3) = \frac{N_{of}}{\tau-\tau_1}[\tau^2(e^{-2}-e^{-3})(e-1)] \simeq 0.147 \, N_{of}\gamma \qquad (18)$$

If the sum of Gates 1 and 2 are used for the capture gamma spectroscopy log and the short burst approximation of equation (17) is applicable, then equation (17) should be modified to include the effects of the two time gates as follows:

$$f(\Sigma) = N_{nf}\left(e^{-\frac{t_2}{\tau}} - e^{-\frac{t_3}{\tau}}\right)t_1 + N_{nf}\left(e^{-\frac{t_4}{\tau}} - e^{-\frac{t_5}{\tau}}\right)t_1 \quad (19)$$

Thus, when the compensating function $f(\Sigma)$ is determined from Equation (15), (17) or (19) as appropriate, the gamma rays from the elements postulated to be in the formation matrix, typically silicon, calcium, magnesium, sulfur and aluminum, can be related to their $\Sigma$ value as follows:

$$\gamma_{Si} = G_{Si} \cdot \Sigma_{Si}/\Sigma \cdot f(\Sigma)$$
$$\gamma_{Ca} = G_{Ca} \cdot \Sigma_{Ca}/\Sigma \cdot f(\Sigma)$$
$$\gamma_{Mg} = G_{Mg} \cdot \Sigma_{Mg}/\Sigma \cdot f(\Sigma)$$
$$\gamma_{S} = G_{S} \cdot \Sigma_{S}/\Sigma \cdot f(\Sigma)$$
$$\gamma_{Al} = G_{Al} \cdot \Sigma_{Al}/\Sigma \cdot f(\Sigma) \quad (20)$$

where the G values are compensating constants which can be determined from test pit formations.

For the two elements, hydrogen and chlorine, which are present both in the formation and the borehole, the gamma ray yield from each element must be considered as the sum of a formation component and a borehole component. Since the borehole component is determined by the thermal neutron flux near the detector which also determines the yield from the iron in the casing, the hydrogen and chlorine borehole components can be related to the iron yield.

Therefore, the hydrogen and chlorine yields can be expressed as follows:

$$\gamma_H = \gamma_{H(formation)} + \gamma_{H(borehole)}$$
$$= G_H \frac{\Sigma_H}{\Sigma} f(\Sigma) + K_H \gamma_{Fe} f(\Sigma) \quad (21)$$

$$\gamma_{Cl} = \gamma_{Cl(formation)} + \gamma_{Cl(borehole)}$$
$$= G_{Cl} \frac{\Sigma_{Cl}}{\Sigma} f(\Sigma) + C \left(\frac{S_B}{1-S_B}\right) K_H \gamma_{Fe} f(\Sigma) \quad (22)$$

where $K_H$ and C are constants which can also be determined from test pit formations, in a manner to be set forth.

Equation (22) is derived by considering a borehole fluid with salinity $S_B$. For this fluid, the ratio of $\gamma_{Cl}$ and $\gamma_H$ in the borehole 2 can be expressed from their equations in group (20) as follows:

$$\frac{\gamma_{Cl(borehole)}}{\gamma_{H(borehole)}} = K \cdot \frac{\Sigma_{Cl(borehole)}}{\Sigma_{H(borehole)}} \quad (23)$$

where K is a proportionality constant.

As will be set forth below, for this borehole fluid of salinity $S_B$ and density $\rho_{sw}$ the macroscopic cross-section of chlorine therein $\Sigma_{Cl(borehole)}$, based on the fractional volume of the fluid occupied by chlorine and the known neutron cross-section for chlorine can be expressed as:

$$\Sigma_{Cl(borehole)} = 339.9 \, S_B \, \rho_{sw} \quad (24)$$

Similarly, as will be shown later, the macroscopic cross-section of hydrogen therein, $\Sigma_{H(borehole)}$, based on the fractional volume of fluid occupied by hydrogen can be expressed as:

$$\Sigma_{H(borehole)} = 22.1 \, (1-S_B) \, \rho_{sw} \quad (25)$$

Substituting Equations (24) and (25) into Equation (23) yields:

$$\frac{\gamma_{Cl(borehole)}}{\gamma_{H(borehole)}} = K \cdot \frac{339.9 \, S_B \, \rho_{sw}}{22.1(1-S_B) \rho_{sw}} \quad (26)$$

or $$\frac{\gamma_{Cl(borehole)}}{\gamma_{H(borehole)}} = 15.4 K \, \frac{S_B}{1-S_B} \quad (26a)$$

or $$\frac{\gamma_{Cl(borehole)}}{\gamma_{H(borehole)}} = C \cdot \frac{S_B}{1-S_B} \quad (26b)$$

Also, since $\gamma_{H(borehole)}$ from Equation (20) is:

$$\gamma_{H(borehole)} = K_H \, \gamma_{Fe} \, f(\Sigma) \quad (27)$$

Substitution of Equation (27) into Equation (26b) and transposition of $\gamma_{H(borehole)}$ yields:

$$\gamma_{Cl(borehole)} = C \cdot \frac{S_B}{1-S_B} \cdot K_H \gamma_{Fe} f(\Sigma) \quad (28)$$

which can be combined with $\gamma_{Cl(formation)}$ of the form of Equation group (20) to give the result of Equation (22).

CALIBRATION CONSTANTS G

The calibration constants G are defined by the source-detector configuration, source strength and the portion of the gamma ray spectra to be analyzed. As an example of how values of $G_i$ for a chemical element may be determined, data are recorded with a continuous neutron source in a test hole containing formations of known constituency, in a sonde which is otherwise of like configuration and source to detector spacing to the sonde 5.

Using Equation (20), $f(\Sigma)=1$ since a continuous source is used rather than a pulsed neutron source and measurements are made in the test formations containing known quantities of each element contributing to the spectrum. Plots are made of $\gamma_i$ against computed values of $\Sigma_i/\Sigma$. From the slope of the line produced, the value of $G_i$ is readily obtained.

Example values of $G_{Si}$, $G_{Ca}$ and $G_{Cl}$, obtained from the $Cf^{252}$ source, a sonde with a 2 × 4 inch NaI (T1) detector, having a source to detector spacing of 17.6 inches and a source strength of $10^8$ neutrons/second are:

$G_{Si}$ = 5775 cps
$G_{Ca}$ = 2460 cps
$G_{Cl}$ = 2440 cps.

Values of G for Mg, S and Al can similarly be obtained in test formations containing varying amounts of these elements. However, this technique cannot be used directly to determine $G_H$ because of the complication of this element occurring also in the borehole water.

$G_H$ is, however, a fixed constant determined by the geometry of the sonde and the part of the gamma ray spectrum used, as will be set forth.

$K_H$ has different values for different borehole conditions. It varies with borehole size, casing weight, casing diameter and type of fluid in the borehole. $K_H$ does not change much for fresh water or oil in the borehole.

Equation (21) can be rearranged into the form $$\frac{\gamma_{Fe}}{\gamma_H} = \frac{1}{K_H} - \frac{G_H}{K_H}\left(\frac{1}{\gamma_H} \cdot \frac{\Sigma_H}{\Sigma}\right) \quad (29)$$

where $f(\Sigma)$ is set to be 1 due to use of a continuous neutron source.

For various test formations theoretical values of $\Sigma_H/\Sigma$ are calculated. Then measured values of $\gamma_{Fe}/\gamma_H$ as a function of the term $$\left(\frac{1}{\gamma_H} \cdot \frac{\Sigma_H}{\Sigma}\right)$$

are plotted so that a determination of values $G_H$ and $K_H$ may be made from the intercepts on their respective plotting axes.

For a test 7 ½ inch borehole filled with fresh water and cased with a 6-⅝ inch, 24-pound casing, example values of $G_H$ and $K_H$ were determined as follows:

$G_H = 216$ cps.
$K_H = 0.0595$

Values of $G_H$ and $K_H$ for other sources, borehole sizes and casing weights can also be determined using the above technique.

Similarly, the constant C of Equation (21) can be determined by making a set of measurements in a test borehole with varying values of borehole salt-water salinity $S_B$.

To summarize, of the parameters used in the Equation group (20), (21) and (22), the values of $\gamma_{Fe}$, $\gamma_{Si}$, $\gamma_{Ca}$, $\gamma_{Mg}$, $\gamma_S$, $\gamma_{Al}$, $\gamma_{Cl}$, and $\gamma_H$ are determined in computer 42 from the least squares fit of the weighted postulated gamma ray spectra to the unknown borehole spectrum; the G values, $K_H$ and C are determined from test pit data; $S_B$ is readily obtained from the well borehole being logged; $\Sigma$ is computed in computer 23; and $f(\Sigma)$ is calculated from the value of $\Sigma$ from Equations (15), (17) or (19) as appropriate.

Therefore, all terms in equation (20) are known except the desired $\Sigma$ contribution of the individual postulated constituents which may then be derived from Equation (20).

It should be noted that it is important to use a pulsed neutron source in order to determine the value of $\Sigma$, so that all terms in the Equation group (20) can be determined. Use of a continuous neutron source would limit the quantitative analysis since the value of $\Sigma$ would be unknown, preventing maximum values from being obtained; however, formation ratios which are often useful and informative could still be obtained.

QUANTITATIVE ANALYSIS OF FORMATIONS

In analyzing subsurface parameters, the primary formation parameters of interest are the formation water salinity S, the formation water saturation $S_w$, the volume fractions of the formation constituents, and the porosity $\phi$ of the formation. With the present invention, these parameters may be quantitatively determined.

In order to determine these formation parameters, it is first necessary, using known techniques to be set forth below, to determine the macroscopic thermal neutron capture cross-sections of the various elements postulated to be present in the formation.

The macroscopic thermal neutron capture cross-section of an element in an earth material can be computed by multiplying the number of atoms of the element per cubic centimeter of the material by the known microscopic thermal neutron capture cross-section of the element. For example, pure water contains $6.69 \times 10^{22}$ hydrogen atoms/cm³ and the microscopic thermal neutron capture cross-section for hydrogen is $0.33 \times 10^{-24}$ cm². Multiplying these two quantities together gives:

Pure water $\Sigma_H = 22.1$ c.u. (1 c.u. = $10^{-3}$cm⁻¹) (30)

Similar quantities can be computed for many earth materials in their pure form such as sandstone (quartz, $SiO_2$), limestone (calcite, $CaCO_3$), dolomite ($MgCO_3 \cdot CaCO_3$), anhydrite ($CaSO_4$), gypsum ($CaSO_4 \cdot 2H_2O$) and alumina ($Al_2O_3$). These computations yield the following values:

Pure quartz,     $\Sigma_{Si} = 4.25$ c.u. (31)
Pure calcite,    $\Sigma_{Ca} = 7.00$ c.u. (32)
Pure dolomite,   $\Sigma_{Ca} = 4.03$ c.u.; $\Sigma_{Mg} = 0.59$ c.u. (33)
Pure anhydrite,  $\Sigma_{Ca} = 5.66$ c.u.; $\Sigma_S = 6.72$ c.u. (34)
Pure gypsum,     $\Sigma_{Ca} = 3.53$ c.u.; $\Sigma_S = 4.19$ c.u. (35)
Pure alumina,    $\Sigma_{Al} = 5.04$ c.u. (36)

For a freshwater saturated formation having fractional porosity $\phi$, $$\Sigma_H = 22.1 \phi \text{ c.u.} \tag{37}$$

If the formation is saturated with saltwater having a salinity S (gms NaCl/gm saltwater) and saltwater density $\rho_{sw}$, then $$\Sigma_H = 22.1 \phi (1-S) \rho_{sw} \tag{38}$$

If instead of being completely saturated with saltwater, the formation has a water saturation $S_w$ and the remainder of the pore space is filled with oil for which a $\Sigma_H$ value of 22.1 is often assumed, then $$\Sigma = 22.1 \phi (1-S) \rho_{sw} S_w + 22.1 \phi (1-S_w) \tag{39}$$
$$= 22.1 \phi \{1 + S_w\{1 - S(\rho_{stc} - 1\} \tag{39A}$$

Calculations also show that for saltwater, the predominant capture is in chlorine which has a large microscopic thermal neutron capture cross-section of 33 × $10^{-24}$ cm². For chlorine in saltwater, $$\Sigma_{Cl} = 339.9 \, S \, \rho_{sw} \tag{40}$$

For a formation with porosity $\phi$ and water saturation $S_w$, $$\Sigma_{Cl} = 339.9 \, S \, \rho_{sw} \, \phi \, S_w \tag{41}$$

For a sandstone formation with porosity $\phi$, the appropriate value of $\Sigma_{Si}$ becomes $$\Sigma_{Si} = 4.25 (1-\phi) \tag{42}$$

Similarly for a limestone formation:

$$\Sigma_{Ca} = 7.00 (1-\phi) \tag{43}$$

It will now be shown that the above quantities can be used in the derivation of relationships for the calculation of formation water salinity S, water saturation $S_w$, porosity $\phi$ and matrix volume fractions.

FORMATION WATER SALINITY S

For a clean salt water sand, the ratio of $\gamma_{Cl}$ to $\gamma_{Si}$ in the formation can be expressed as:

$$\frac{\gamma_{Cl(formation)}}{\gamma_{Si}} = \frac{\gamma_{Cl} - \gamma_{Cl(borehole)}}{\gamma_{Si}} = \frac{G_{Cl}}{G_{Si}} \cdot \frac{\Sigma_{Cl}}{\Sigma_{Si}} \cdot \frac{f(\Sigma)}{f(\Sigma)}$$
$$= \frac{G_{Cl}}{G_{Si}} \cdot \frac{\Sigma_{Cl}}{\Sigma_{Si}} \tag{44}$$

It is to be noted that this ratio is independent of $\Sigma$ and extraneous neutron absorbers in the formation such as boron.

Substituting Equations (41) and (42) in Equation (44) gives:

$$\frac{\gamma_{Cl(formation)}}{\gamma_{Si}} = \frac{339.9 \, G_{Cl} \, S \, \rho_{sw} \, \phi}{4.25 \, G_{Si} (1-\phi)} \tag{45}$$

or, after rearranging terms $$S \cdot \rho_{sw} = 0.0125 \frac{G_{Si}}{G_{Cl}} \cdot \frac{(1-\phi)}{\phi S_w} \cdot \frac{\gamma_{Cl(formation)}}{\gamma_{Si}} \quad (46)$$

Since $\rho_{sw}$ is a well-known function of S, the value of S, the formation water salinity, can be readily determined from the element gamma ray spectra determined from Equation (46). It is necessary to know the porosity $\phi$ for this determination in the sand formation.

For a clean water saturated limestone, calcium, rather than silicon, is the element of interest. The capture cross-section of calcium $\Sigma_{Ca}$ in such a limestone has been set forth above. The ratio of the gamma ray spectra $\gamma_{Cl}$ of chlorine to $\gamma_{Ca}$ of calcium in such a formation is thus expressed as follows:

$$\frac{\gamma_{Cl(formation)}}{\gamma_{Ca}} = \frac{G_{Cl}}{G_{Ca}} \cdot \frac{\Sigma_{Cl}}{\Sigma_{Ca}} = \frac{339.9 \, G_{Cl} \, S \, \rho_{sw} \phi}{7.00 \, G_{Ca}(1-\phi)} \quad (47)$$

or, after rearranging terms:

$$S \cdot \rho_{sw} = 0.0206 \frac{G_{Ca}}{G_{Cl}} \cdot \frac{(1-\phi)}{\phi S_w} \cdot \frac{\gamma_{Cl(formation)}}{\gamma_{Ca}} \quad (48)$$

In situation where the porosity $\phi$ of the formation is not known, the $\gamma$ yields of hydrogen and chlorine in the formation can be related by:

$$\frac{\gamma_{Cl}-\gamma_{Cl(borehole)}}{\gamma_H-\gamma_{H(borehole)}} = \frac{\gamma_{Cl(formation)}}{\gamma_{H(formation)}} = \frac{G_{Cl}\Sigma_{Cl}}{G_H\Sigma_H} \quad (49)$$

since the $f(\Sigma)$ and $\Sigma$ terms cancel. As before, $\Sigma_{Cl} = 339.9 \, S \, \rho_{sw}\phi$ capture units, and, similarly $\Sigma_H = 22.1(1-S) \rho_{sw}\phi$ capture units. Substituting these values in Equation (49) gives:

$$\frac{\gamma_{Cl(formation)}}{\gamma_{H(formation)}} = \frac{339.9}{22.1} \cdot \frac{S}{(1-S)} \cdot \frac{G_{Cl}}{G_H} \quad (50)$$

or, on rearranging $$S = \frac{1}{1+15.4 \cdot \frac{G_{Cl}}{G_H} \cdot \frac{\gamma_{H(formation)}}{\gamma_{Cl(formation)}}} \text{ gms NaCl/gm saltwater} \quad (51)$$

It is thus to be noted that knowledge of porosity $\phi$ is not required for this determination of S, the formation water salinity in the limestone formation.

Alternatively, substitution of the generalized expressions for $\Sigma_{Cl}$ and $\Sigma_H$ set forth above into Equation (34) yields:

$$\frac{\gamma_{Cl(formation)}}{\gamma_{H(formation)}} = \frac{339.9}{22.1} \cdot \frac{S \rho_{sw} \, S_w}{[1+S_w-S(\rho_{sw}-1)]} \cdot \frac{G_{Cl}}{G_H} \quad (52)$$

where $S_w$, the formation water saturation is less than unity; Equation (52) can be arranged into the form:

$$S = \frac{(1+S_w-S_w)}{S_w} \cdot \frac{1}{\left[1+15.4 \frac{G_{Cl}}{G_H} \cdot \frac{\gamma_{H(formation)}}{\gamma_{Cl(formation)}}\right]} \quad (53)$$

As a further alternative, where the water saturation $S_w$, porosity $\phi$ and cross-section $\Sigma$ of a formation are known, but lithology is unknown, the salinity S can be derived from the fractional volume of chlorine in the porous portions of the unknown formation, based on the salinity and saturation thereof as follows:

$$S = \frac{.00294}{G_{Cl}\phi S_w} \cdot \frac{\Sigma}{f(\Sigma)} \cdot \gamma_{Cl(formation)} \quad (54)$$

FORMATION WATER SATURATION

If the apparent salinity of a sand formation is S and the salinity of a known water saturated formation is $S_o$, then the water saturation $S_w$ of the unknown formation is given by $$S_w = \frac{100 S}{S_o} \% \quad (55)$$

For simplicity of computation, it is assumed that $\rho_{sw}$ is the same for the two formations (i.e., waters have same true salinity), then by substitution from Equation (46) into Equation (55) yields:

$$S_w = \frac{100 \left[\frac{(1-\phi)}{\phi} \cdot \frac{\gamma_{Cl(formation)}}{\gamma_{Si}}\right] \text{unknown}}{\left[\frac{(1-\phi)}{\phi} \cdot \frac{\gamma_{Cl(formation)}}{\gamma_{Si}}\right] \text{water sand}} \quad (56)$$

Similarly, for a limestone formation, substitution of Equation (53) into Equation (55) yields:

$$S_w = \frac{100 \left[\frac{(1-\phi)}{\phi} \cdot \frac{\gamma_{Cl(formation)}}{\gamma_{Ca}}\right] \text{unknown}}{\left[\frac{(1-\phi)}{\phi} \cdot \frac{\gamma_{Cl(formation)}}{\gamma_{Ca}}\right] \text{water limestone}} \quad (57)$$

Where the nature of the formation and its porosity are not known, substitution of Equation (51) into Equation (55) yields:

$$S_w = 100 \cdot \frac{\left[1+15.4 \frac{G_{Cl}}{G_H} \cdot \frac{\gamma_{H(formation)}}{\gamma_{Cl(formation)}}\right] \text{water saturated}}{\left[1+15.4 \frac{G_{Cl}}{G_H} \cdot \frac{\gamma_{H(formation)}}{\gamma_{Cl(formation)}}\right] \text{unknown}} \quad (58)$$

VOLUME FRACTION OF FORMATION CONSTITUENTS

The chemical elements typically present in the vicinity of a wellbore, and the materials or components which usually give rise to the presence of these elements are: iron, due to the casing and sonde; silicon, due to sandstone; calcium, from limestone, dolomite and/or anhydrite; magnesium, in dolomite; aluminum from aluminosilicates in clays; sodium and chlorine from salt and/or salt water; and hydrogen and oxygen from both fresh water and salt water.

As has been set forth above, the comparison computer 42 performs a least squares fit to express the total gamma ray counts $\gamma$ in terms of the yield from each element contributing, according to Equation (4) above. Alternatively, since the gamma ray counts of typical formations elements are more easily obtained from test pits in terms of the actual materials postulated to be present in the formation, the comparison computer 42 may perform a least squares fit program to express the total gamma ray counts $\gamma$ in terms of the yield from each material or component as:

$$\gamma = \gamma_{Fe} + \gamma_{SiO_2} + \gamma_{CaCO_3} + \gamma_{MgCO_3 \cdot CaCO_3} + \gamma_{CaSO_4} + \gamma_{Al_2O_3} + \gamma_{NaCl} + \gamma_{H_2O} \quad (59)$$

Of the chemical elements in these materials typically present in subsurface formations, neither carbon nor oxygen contribute significantly to the capture gamma ray counts due to having negligible capture cross-sections for thermal neutrons. The primary gamma rays of carbon and oxygen arise from bombardment of these elements with fast neutrons. However, as has been set forth above, the time gate arrangement of the clock control network 21 prevents these fast neutrons caused gamma rays from being counted and analyzed.

Futher, the capture gamma rays from sodium due to thermal neutrons are negligible in comparison to those from chlorine due to equal numbers atoms of both elements being present in sodium chloride, and the microscopic capture cross-section of chlorine being 33 barns, in comparison to 0.5 barns for sodium, where one barn is $10^{-24}$ cm$^2$.

Thus, as will be set forth in detail below, volume fractions of formation constituents may be determined from the capture cross-sections of the pure elements determined in Equations (30) through (43) in the manner set forth above, the macroscopic cross-section $\Sigma$ of the formation, determined in the manner set forth in Equation (3) in the Sigma computer 23 and the gamma ray spectra from the comparison computer 42.

For any formation, the volume fractions present therein can be expressed as the unity relationship that $$V_{SiO_2} + V_{lime} + V_{dol} + V_{anhy} + V_{alumina} + V_{H_2O} = 1 \quad (60)$$

Thus, the percentage volume $V_{SiO_2}$ of an unknown formation which is partially sandstone can be expressed with respect to a 100% sandstone formation as the following:

$$V_{SiO_2} = \frac{\Sigma_{Si}}{4.25} \quad (61)$$

where $\Sigma_{Si}$ is determined using $\gamma_{Si}$ from Equation Group (20).

Since calcium exists in limestone, dolomite, anhydrite and gypsum, it can only be used as a quatitative limestone indicator if the other three components are known.

The capture cross-section for calcium in these types of rock, based on the volume fraction occupied has been set forth in Equations (33) through (35) above. In general, anhydrite and gypsum do not occur together but are transformed into each other depending on the pressure and temperature.

A three component system of unknown fractional volume, of limestone, dolomite and anhydrite can first be considered. For the fractional volumes $V_{lime}$, $V_{dol}$ and $V_{anhy}$ it can be written:

$$\Sigma_{Ca} = 7.00\ V_{lime} + 4.03\ V_{dol} + 5.66\ V_{anhy} \quad (62)$$

The percentage volume occupied in an unknown formation which is partially dolomite using Equation (33), $V_{dol}$ can be expressed with respect to a 100% dolomite formation as:

$$V_{dol} = \frac{\Sigma_{Mg}}{0.592} \quad (63)$$

where $\Sigma_{Mg}$ is obtained from Equation Group 20; and the percentage volume for anhydrite in such an unknown formation can be expressed with respect to a 100% anhydrite formation using $\Sigma_S$ from Equation Group 20 as:

$$V_{anhy} = \frac{\Sigma_S}{6.72} \quad (64)$$

Substitution from Equations (63) and (64) into Equation (62) yields:

$$\Sigma_{Ca} = 7.00\ V_{lime} + \frac{4.03}{0.592}\Sigma_{Mg} + \frac{5.66}{6.72}\Sigma_S \quad (65)$$

or, after rearranging:

$$V_{lime} = 0.143\ \Sigma_{Ca} - 0.972\ \Sigma_{Mg} - 0.120\ \Sigma_S \quad (66)$$

Similarly, for a limestone, dolomite, gypsum mixture:

$$\Sigma_{Ca} = 7.00\ V_{lime} + 4.03\ V_{dol} + 3.53\ V_{gyp} \quad (67)$$

For the volume percentage of gypsum in a limestone, dolomite, gypsum mixture, the volume fraction of gypsum with respect to a 100% gypsum formation can be expressed as:

$$V_{gyp} = \frac{\Sigma_S}{4.19} \quad (68)$$

Substituting for $V_{dol}$ and $V_{gyp}$ from Equations (63) and (68) gives $$\Sigma_{Ca} = 7.00\ V_{lime} + \frac{4.03}{0.592}\Sigma_{Mg} + \frac{3.53}{4.19}\Sigma_S \quad (69)$$

which again gives $$V_{lime} = 0.143\ \Sigma_{Ca} - 0.972\ \Sigma_{Mg} - 0.120\ \Sigma_S \quad (66)$$

Therefore, the value $V_{lime}$ can be determined from Equation (66) regardless of whether sulfur is present in the form of anhydrite or gypsum.

For an unknown formation which is partially occupied by alumina in clays, the volume fraction or shaliness indicator, $V_{Al_2O_3}$, can be expressed with respect to a 100% Al$_2$O$_3$ formation as:

$$V_{Al_2O_3} = \frac{\Sigma_{Al}}{5.04} \quad (70)$$

where $\Sigma_{Al}$ is obtained from Equation Group (20).

The volume of water present, $V_{H_2O}$, in an unknown formation which is 100% water saturated, can be expressed using $\Sigma_H$ from Equation (38) as:

$$V_{H_2O} = \frac{\Sigma_H}{22.1} = (1-S)\rho_{sw}\phi \quad (71)$$

Where the water saturation $S_W$ is less than unity, an alternative expression for the $V_{H_2O}$ is used. For such an unsaturated formation of porosity $\phi$, with both salt water and oil therein, the capture cross-section $\Sigma_H$ in the formation is set forth in Equation (39), and substitution of this expression for $\Sigma_H$ into Equation (39) and rearranging terms yields:

$$V_{H_2O+oil} = \phi[1+S_w\{(1-S)\rho_{xw}-1\}]  \quad (72)$$

A quantity $\Sigma_X$ can be used as a shale indicator, since it determines the relative neutron capture in elements which do not give rise to measurable gamma rays in the spectrum. Such elements are dominated by boron and the rare earth elements which even at very low concentrations of a few parts per million can absorb a considerable fraction of the thermal neutrons present. For instance, the microscopic thermal neutron cross-section is 759 barns, or more than 20 times that of chlorine, and that for gadolinium is 47,000 barns, over 60 times that of boron, values which are thus considerably greater than for the more common elements in typical borehole functions.

The quantity $\Sigma_X$ can be determined from Equation (5) by subtracting the sum of the elemental $\Sigma$ values from the measured value of $\Sigma$ for the formation. By determining $\Sigma_X$ in known 100% shale zones, the value of the shale fraction $V_{sh}$ in cleaner formations can be determined using the equation:

$$V_{sh} = \frac{(\Sigma_X)_{unknown\ formation}}{(\Sigma_X)_{known\ 100\%\ shale}} \quad (73)$$

However, the high capture cross-section elements are also present even in a clean sand and $\Sigma_X$ for a clean sand to be on the order of six c.u. To compensate for this, it is often desirable to normalize Equation (73) above so that a more accurate shale fraction $V_{sh}$ may be expressed as:

$$V_{sh} = \frac{\Sigma_X - \Sigma_{X(clean\ formation)}}{\Sigma_{X(100\%\ shale)} - \Sigma_{X(clean\ formation)}} \quad (74)$$

RATIOS OF FORMATION COMPONENTS

When it is known that there is no dolomite, anhydrite or gypsum present in a formation, Equation (62) reduces to $$V_{lime} = 0.143\ \Sigma_{Ca} = \frac{\Sigma_{Ca}}{7.00} \quad (75)$$

Using this relationship and Equation (61), the limestone/sandstone ratio can be written as:

$$\frac{V_{lime}}{V_{sand}} = \frac{4.25}{7.00} \frac{\Sigma_{Ca}}{\Sigma_{Si}} = 0.607 \frac{\Sigma_{Ca}}{\Sigma_{Si}} \quad (76)$$

From Equation Group (20) this can be expanded to give:

$$\frac{V_{lime}}{V_{sand}} = 0.607\ \frac{\Sigma\gamma_{Ca}}{G_{Ca}f(\Sigma)} \cdot \frac{G_{Si}f(\Sigma)}{\Sigma\gamma_{Si}} \quad (77)$$

or $$\frac{V_{lime}}{V_{sand}} = 0.607\ \frac{G_{Si}}{G_{Ca}} \cdot \frac{\gamma_{Ca}}{\gamma_{Si}} \quad (77A)$$

a ratio which is valid from data obtained using a pulsed or a continuous neutron source.

The shaliness indicator, or ratio of $V_{Al_2O_3}$ to $V_{SiO_2}$, can be obtained from Equations (70) and (61) as:

$$\frac{V_{Al_2O_3}}{V_{SiO_2}} = \frac{4.25}{5.04} \frac{\Sigma_{Al}}{\Sigma_{Si}} = 0.843\ \frac{\Sigma_{Al}}{\Sigma_{Si}} \quad (78)$$

Using the appropriate ones of Equation group (20), this becomes:

$$\frac{V_{Al_2O_3}}{V_{SiO_2}} = 0.843\ \frac{G_{Si}}{G_{Al}} \cdot \frac{\gamma_{Al}}{\gamma_{Si}} \quad (79)$$

For limestone formations, the shaliness indicator is the ratio of $V_{Al_2O_3}$ to $V_{lime}$, and from Equation (75) for no dolomite, anhydrite or gypsum in a formation;

$$V_{lime} = \frac{\Sigma_{Ca}}{7.00} \quad (80)$$

Therefore, using Equation (70)

$$\frac{V_{Al_2O_3}}{V_{lime}} = \frac{V_{Al_2O_3}}{V_{CaCO_3}} = \frac{7.00}{5.04} \frac{\Sigma_{Al}}{\Sigma_{Ca}} = 1.389\ \frac{\Sigma_{Al}}{\Sigma_{Ca}} \quad (81)$$

Using the appropriate Equation from group (20), this becomes:

$$\frac{V_{Al_2O_3}}{V_{CaCO_3}} = 1.389\ \frac{G_{Ca}}{G_{Al}} \cdot \frac{\gamma_{Al}}{\gamma_{Ca}} \quad (82)$$

To determine the dolomite/limestone ratio in situations where either anhydrite or gypsum may be present, from Equations (63) and (66):

$$\frac{V_{dol}}{V_{lime}} = \frac{\Sigma_{Mg}}{0.592\ (0.143\ \Sigma_{Ca}-0.972\ \Sigma_{Mg}-0.120\ \Sigma_S)} \quad (83)$$

Using the appropriate equations from Equation group (20), this becomes:

$$\frac{V_{dol}}{V_{lime}} = \frac{\dfrac{\Sigma\gamma_{Mg}}{G_{Mg}f(\Sigma)}}{0.0846\ \dfrac{\Sigma\gamma_{Ca}}{G_{Ca}f(\Sigma)}-0.575\ \dfrac{\Sigma\gamma_{Mg}}{G_{Mg}f(\Sigma)}-0.0710\ \dfrac{\Sigma\gamma_S}{G_Sf(\Sigma)}} \quad (84)$$

which reduces to $$\frac{V_{dol}}{V_{lime}} = \frac{1}{0.0846\ \dfrac{G_{Mg}}{G_{Ca}} \cdot \dfrac{\gamma_{Ca}}{\gamma_{Mg}} - 0.575 - 0.0710\ \dfrac{G_{Mg}}{G_S} \cdot \dfrac{\gamma_S}{\gamma_{Mg}}} \quad (85)$$

It should be noted that other component ratios may similarly be developed using similar procedures.

POROSITY $\phi$

By rearranging Equation (38), when the salinity S and salt water density $\rho_{sw}$ are known and $S_W$ is unity, the porosity $\phi$ can be determined to be:

$$\phi = \frac{100 \Sigma_H}{22.1 \ (1-S)\rho_{sw}} \% \qquad (86)$$

Alternatively, using Equation (41)

$$\phi = \frac{100 \Sigma_{cl}}{339.9 \ S \ \rho_{sw}} \% \qquad (87)$$

Where salinity S is unknown, but $S_W$ remains at unity, Equation (87) can be rearranged to the form:

$$S = \frac{100 \Sigma_{cl}}{339.9 \ \phi \ \rho_{sw}} \qquad (88)$$

and this expression for salinity substituted into Equation (87), which after rearranging the terms, yields an expression for porosity $\phi$ which is not dependent on salinity S:

$$\phi = \frac{100}{\rho_{sw}} \left[ \frac{\Sigma_H}{22.1} + \frac{\Sigma_{cl}}{339.9} \right] \qquad (89)$$

When the saturation $S_W$ is less than unity, Equation (86) is not used, but rather Equation (39) above is used in a rearranged format to define porosity $\phi$ as:

$$\phi = \frac{100 \Sigma_H}{22.1[1+S_W\{(1-S)\rho_{sw}-1\}]} \qquad (90)$$

Similarly, when the saturation $S_W$ is less than unity, Equation (87) is modified to compensate for the amount of saturation actually present, and Equation (87) is thus modified to read as:

$$\phi = \frac{100 \Sigma_{cl}}{339.9 \ S \ \rho_{sw} S_W} \qquad (91)$$

Where the salinity S is unknown and saturation $S_W$ is known and is less than unity, Equation (91) is rearranged to express salinity S as a function of the remaining variables and this expression of S substituted into Equation (90). When this expression is rearranged, the porosity $\phi$ can then be expressed as:

$$\phi = \frac{100}{[1+S_W(\rho_{sw}-1)]} \left[ \frac{\Sigma_H}{22.1} + \frac{\Sigma_{cl}}{339.9} \right] \qquad (92)$$

Alternatively, when salinity S is known, and water saturation $S_W$ is unknown, Equation (91) is rearranged to express water saturation $S_W$ as a function of the remaining variables, and the expression for $S_W$ substituted into Equation (90). After rearranging terms, the porosity $\phi$ can then be expressed as:

$$\phi = 100 \left[ \frac{\Sigma_H}{22.1} - \frac{\Sigma_{cl}}{339.9} \left\{ \frac{(1-S)\rho_{sw}-1}{S\rho_{sw}} \right\} \right] \qquad (93)$$

Yet another method of determining formation porosity $\phi$ is to subtract the sum of the volume fractions of each formation constituent rock from 1.

From the foregoing, it can be seen that the Equations disclosed above according to the present invention afford several alternative methods of quantitatively determining subsurface formation parameters including salinity S, water saturation $S_W$, porosity $\phi$ and matrix volume fractions from the capture cross-section $\Sigma$ and the element gamma ray spectra.

Chart I, below, sets forth the above elements of lithology, alternate Equations by which these lithology elements may be determined, parameters required (in addition to the element gamma ray spectra $\gamma_i$) for the alternate Equation to be used, and parameters not required.

CHART I

| To be determined | Equation | Parameters required | Parameters not required |
|---|---|---|---|
| Salinity | 46 | known sand, $\phi, S_W, \Sigma$ | |
| | 48 | known lime, $\phi, S_W, \Sigma$ | |
| $S$ | 51 or 53 | $S_W$ | $\phi$, type of rock |
| | 54 | $\phi, S_W, \Sigma$ | type of rock |
| Water Saturation $S_W$ | 56 | known sand, $\phi$, $S$ must be constant | |
| | 57 | known lime, $\phi$, $S$ must be constant | |
| | 58 | $S$ must be constant | $\phi$, type of rock |
| Porosity $\phi$ | 86 or 90 | $S, S_W, \Sigma$ | |
| | 87 or 91 | $S, S_W, \Sigma$ | |
| | 89 | For $S_W=1$: $\Sigma$ | $S$ |
| | 92 | $S_W, \Sigma$ | $S$ |
| | 93 | $S, \Sigma$ | $S_W$ |
| Matrix Volume | 61–85 | $\Sigma$ | |

It is important to note that but for the compensating function $f(\Sigma)$ developed according to the present invention, the interrelation of the element gamma ray spectra $\gamma$ and the capture cross-sections $\Sigma$ could not be achieved.

From Chart I above, it is further evident that numerous alternate computation sequences of determining quantitatively the formation parameters of interest may be used. However, in the preferred embodiment a sequence of steps are performed, in a manner to be set forth below, to change the state of the log data from the time varying data of the gates 21 and the energy varying data of the pulse height analyzer 25 to form output records of quantitative formation parameters for further analysis.

Further, in the preferred embodiment set forth below, relatively little prior information concerning the lithology need be known, permitting processing of data according to the present invention even in areas where little is known of the lithology.

DETERMINATION OF FORMATION PARAMETERS

Figure 3:
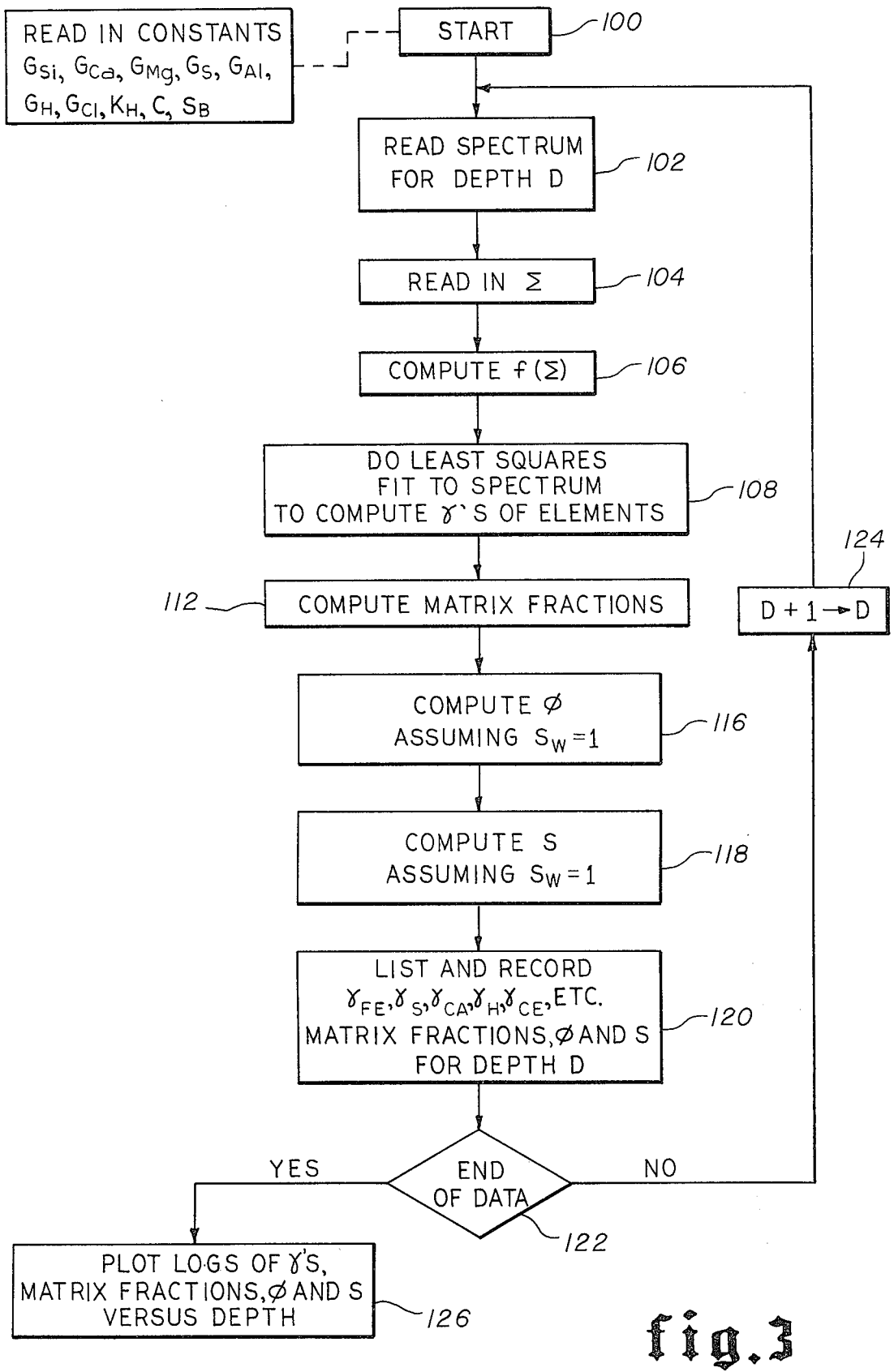
FIGS. 3 and 4 are logic flow diagrams of the process steps suitable for performance in a digital computer according to the present invention.
Figure 4:
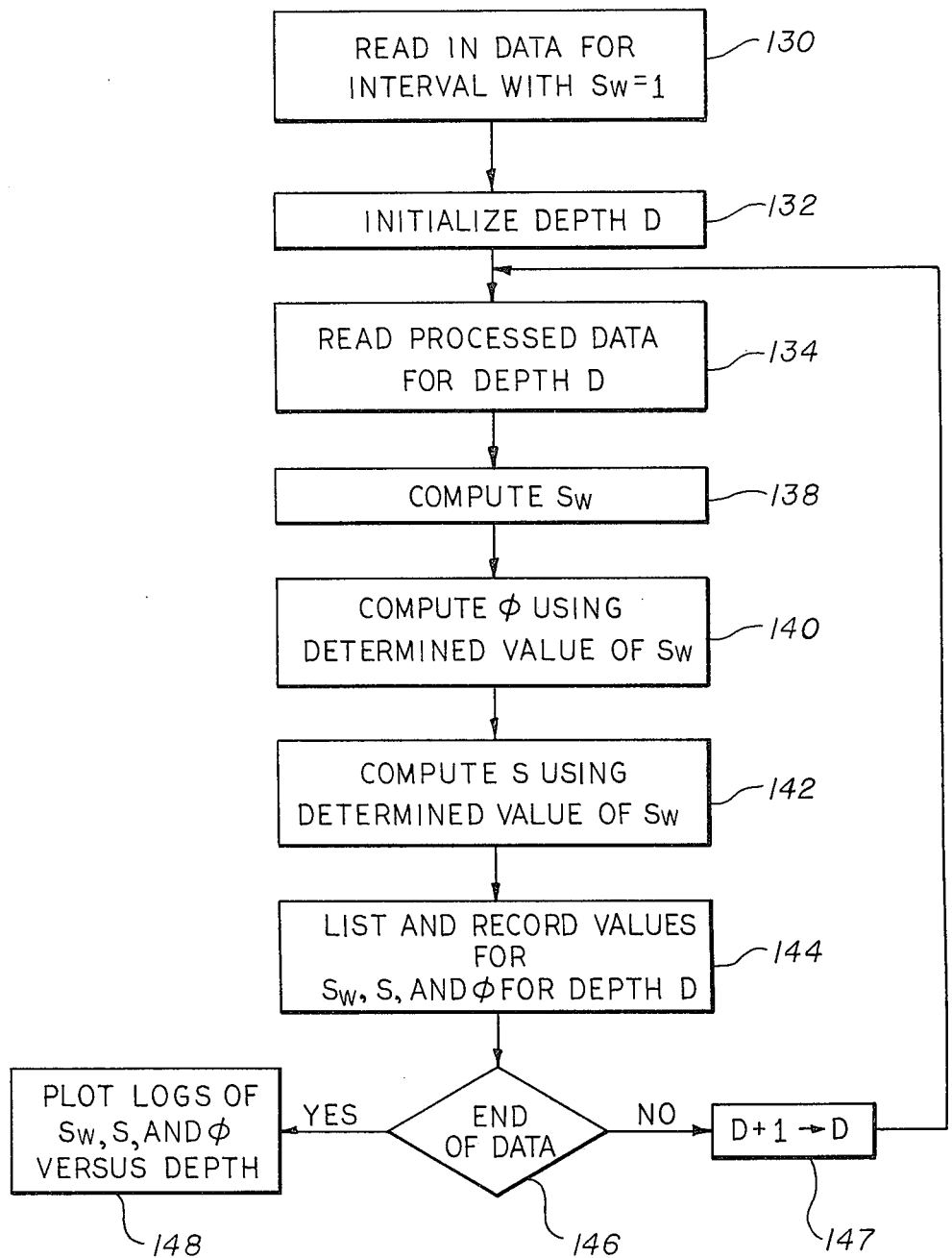

The formation macroscopic thermal neutron capture cross-section $\Sigma$ from the $\Sigma$ computer 23 and the least square fitted element gamma ray spectra from the comparison computer 42 are provided to a formation parameter computer 46. The functions accomplished by, and process steps performed in, each of comparison computer 42, formation parameter computer 46 and the capture cross-section computer 23 are in the preferred embodiment obtained from the use of a general purpose digital computer, such as a Control Data Corporation CDC 7600, operating under the control of a sequence of steps set forth in a flow chart F (FIGS. 3 and 4). The flow chart F sets forth the sequence of steps for controlling the computer in a manner sufficient to enable one of skill in the art to use the present invention by writing computer language instructions, such as in the FORTRAN programming language, or other suitable computer language to perform the process steps set forth therein. When the computer is operating under control of the process steps F, it is a new and improved automatic data processing machine.

As will be understood by those of ordinary skill in the geophysical and more particularly the well-logging art, the comparison in computer 42, the determination of $\Sigma$ in the computer 23 and the derivation of formation parameters in computer 46, to be set forth below, may also be done in a special purpose "hard-wired" digital processing circuit, or a special purpose analog circuit.

Considering the flow chart F more in detail (FIGS. 3 and 4), a start instruction 100 causes the computer to read into the memory thereof the borehole salinity $S_B$ and constants $G_{Si}$, $G_{Ca}$, $G_{Mg}$, $G_S$, $G_{Al}$, $G_H$, $G_{Cl}$, C and $K_H$, obtained from test pit formations or boreholes or laboratory testing, which define certain fixed relations of the gamma ray response of the elements postulated to be in the borehole formations. These constants are used from the computer memory during certain processing steps, as will be set forth below. The start instruction 100 further causes the computer to initialize a depth designator D to an appropriate depth for processing.

After the start instruction 100, the computer reads in the unknown formation gamma ray spectrum for the depth D from the pulse height analyzer 25 under control of an instruction 102. In addition to this gamma ray spectrum, the computer under control of an instruction 104 reads in the corresponding thermal neutron macroscopic capture cross-section $\Sigma$, determined in computer 23 in the manner set forth above. An instruction 106 assumes control of the computer and causes the computer to compute the compensation function $f(\Sigma)$. The function $f(\Sigma)$ is determined in the manner set forth above.

An instruction 108 assumes control of the computer after the step 106 and causes the computer to perform the least-squares fit, in the manner set forth above, to minimize the squared difference between the standard element spectra and the unknown formation spectrum from the sonde 5 and pulse height analyzer 23.

The computer 42 performs the comparison of the unknown formation gamma ray spectra from the pulse height analyzer 25 with the standard spectra from the source 30, in the manner set forth above, to obtain element gamma ray spectra indicating the relative presence of materials postulated to be in the formation 3.

Control of the computer is then transferred to an instruction 112 which causes the computer to compute the matrix fractions, or formation constituent fractions of the subsurface lithology, defining the relative presence of sandstone, limestone, dolomite, anhydrite or other materials, in the subsurface formations from the element gamma ray spectra. The computer under control of the step 112 determines the relative volume fractions of the unknown formation constituents, in accordance with the volume fraction Equations (61) and following, set forth above, based on the element gamma ray spectra. If desired, certain of the calculations may be omitted, where the element gamma ray spectra indicate that certain types of rock are unlikely to be present.

An instruction 116 then assumes control of the computer and causes the computer to calculate the porosity of the unknown formation from the element gamma ray spectra. The computer under control of instruction 116 determines the porosity in accordance with the Equations set forth above. It is preferable that Equation (89) be solved with water saturation $S_W$ assumed to be 100%, since the only other parameter required to determine porosity $\phi$ with this Equation is the macroscopic cross-section $\Sigma$.

Control of the computer is then transferred to an instruction 118 which causes the computer to determine the salinity of the unknown formation in accordance with Equation (38), with the formation water saturation $S_W$ assumed to be unity, since the saturation $S_W$ is the sole parameter required in addition to the element gamma ray spectra for such a computation.

Control of the computer is then transferred to an instruction 120 which causes the computer to list and record the gamma spectra determined by the computer under control of step 108, the matrix volume fractions determined during performance of step 112, the porosity determined during step 116 and the salinity determined during step 120. Control of the computer is then transferred to a decision instruction 122 which examines the data to be processed and, if further data to be processed is present, transfers control of the computer to a step 124 which increments the counter D, defining the depth of the sonde in the borehole for the spectrum presently being processed, and subsequently control of the computer is transferred to the step 102, which reads in the next unknown spectrum from the comparison computer 34 for the new depth D.

If all data have been processed, control of the computer is transferred by decision instruction 122 to an instruction 126 and the processed data are then presented to a recorder 48 so that an output record 50 of the quantitative formation properties or parameters at the various depths in the borehole 2 indicating porosity, salinity, and matrix fractions of the subsurface lithology, determined in the manner set forth above, may be presented.

However, further refinement of the quantitative lithology may be obtained. After performance of the steps set forth above, the data output from the computer are inspected. By comparing values of the computed parameters, primarily porosity $\phi$ and salinity S with previously known characteristics for this field, a zone which is established to be water saturated is chosen at a depth X. The previously known field characteristics could be established from prior well logs in the field for resistivity and porosity or from the observed salinity of produced waters in the area. The selected depth X, other constants and processing results are then read into the computer and control of the computer is transferred to a step 130 which causes the computer to read in the data concerning the previously computed formation parameter derived for the selected depth chosen to have a water saturation of unity.

A process step the 132 sets the depth counter D in the computer to a new initial value equal to the beginning of the logged portion of the well. An instruction 134 then assumes control of the computer and causes the computer to read in further processed data for the depth D, defined by the counter D, so that such data may be processed in a manner to be set forth below.

An instruction 138 then assumes control of the computer and causes the computer to compute the revised water saturation $S_w$ for the depth D based on Equation (49) using the readings for depth X as the water saturated regions and the regions for dept D as the unknown saturation. From this revised saturation $S_w$ for the depth D, the remaining lithology values determined and stored during steps 102 through 126 may be further refined and increased in accuracy.

An instruction 140 then assumes control of the computer and causes recomputation of the porosity $\phi$ at the depth D to increase the accuracy of the previous computation. Using the newly computed value of $S_w$ for water saturation determined in step 138, based on the Equation (76) for computation of porosity $\phi$ set forth above.

Control of the computer is then transferred to an instruction 142 which causes the computer to recompute the salinity S of the formation lithology to increase the accuracy, based on Equation (39) set forth above, using the newly computed value of water saturation $S_w$ determined during performance of step 138.

Control of the computer is then transferred to an instruction 144 which causes the computer to list and record the newly computed and more accurate values for water saturation $S_w$, salinity S and porosity $\phi$ from the steps 138, 140 and 142 for the depth D in the recorder 46.

Control is then transferred to a decision instruction 146 which examines the data to determine whether all data have been processed. If all data have not been processed, an instruction 147 increments the depth counter D and transfers control of the computer to the instruction 134 for read-in of further data for processing in the manner set forth above.

In the event the computer under control of decision instruction 146 determines all data have been processed, an alternate instruction 148 assumes control of the computer and causes the computer to transfer the data to the recorder 48 for display of the revised values in output logs of salinity, water saturation and porosity as a function of depth in the borehole 2.

From the foregoing, it can be seen that the logging system L of the present invention can be used to provide quantitative measurements of the formation water salinity S, the formation water saturation $S_w$, the formation porosity $\phi$ and the major formation matrix components (sandstone, limestone, dolomite, anhydrite, gypsum, shale) with a single pass of the logging tool L in the borehole 2. For this analysis, the formation capture cross section $\Sigma$ must be known. This can be obtained simultaneously with the capture gamma spectroscopy log if a pulsed neutron source is used (pulse repetition rate of 1000 cycles/second would be satisfactory). Alternatively, $\Sigma$ could be obtained from a separately run thermal decay time, thermal neutron decay, or "Lifetime" log and a continuous neutron source could be used for the capture gamma spectroscopy log.

If a continuous neutron source is so used and $\Sigma$ values are not available, the formation salinity S and water saturation $S_w$ can still be determined exactly. However, only maximum possible values can be determined for the porosity $\phi$ and the formation matrix components. However, ratios of the matrix components such as limestone/sandstone ratio and dolomite/limestone ratio can still be computed exactly.

It should be understood that the foregoing embodiment is the preferred embodiment of the present invention, although numerous modifications, adjustments, changes in the program language or flow chart format, or the data output format, all coming within the scope of the appended claims, will occur to those of ordinary skill in the art.

I claim:
1. A method for analysis of earth formations surrounding a well borehole wherein the macroscopic thermal neutron capture cross-section of the formations is known, comprising the steps of:
    a. obtaining standard gamma ray energy spectra of materials postulated to be in formations surrounding a well borehole;
    b. bombarding the earth formations in the vicinity of the borehole with fast neutrons which are slowed down and thereafter engage in neutron capture reactions with materials in the vicinity of the borehole;
    c. obtaining gamma ray energy spectra of unknown materials surrounding the well borehole;
    d. comparing an unknown gamma ray spectrum with a composite weighted mixture of the standard gamma ray spectra to obtain therefrom a quantitative measure of the percentage composition of elements in the vicinity of the borehole; and
    e. obtaining quantitatively the primary formation parameters of the formation from the quantitative measure of percentage composition of elements and the known macroscopic thermal neutron capture cross-section of the formation.

2. The method of claim 1, further including the step of:
    obtaining the macroscopic thermal neutron capture cross-section of the formation surrounding the borehole with a separate logging tool prior to said step of obtaining gamma ray energy spectra.

3. The method of claim 1, wherein:
    a. said step of bombarding the earth formation with high energy neutrons comprises bombarding the formation with repetitive pulses of fast neutrons; and
    b. compensating the unknown gamma ray spectrum for variations in the thermal neutron capture cross-section of materials present in the earth formations surrounding the borehole.

4. The method of claim 1, wherein:
    said step of bombarding the earth formation with high energy neutrons comprises continuously bombarding the formation with fast neutrons.

5. The method of claim 1, further including the step of:
    forming a record of the obtained quantitative primary formation parameters as a function of borehole depth.

6. The method of claim 1, wherein:
    said step of obtaining gamma ray spectra is performed during a single pass of said neutron source through the borehole.

7. A method for analysis of earth formations surrounding a well borehole wherein the macroscopic thermal neutron capture cross-section of the formations is known, comprising the steps of:
    a. obtaining standard gamma ray energy spectra of materials postulated to be in formations surrounding a well borehole;

b. bombarding the earth formations in the vicinity of the borehole with fast neutrons which are slowed down and thereafter engage in neutron capture reactions with materials in the vicinity of the borehole;

c. obtaining gamma ray energy spectra of unknown materials surrounding the well borehole;

d. comparing an unknown gamma ray spectrum with a composite weighted mixture of the standard gamma ray spectra to obtain therefrom a quantitative measure of the percentage composition of elements in the vicinity of the borehole; and e. obtaining the water saturation of the earth formation from the quantitative measure of percentage composition of elements and the known macroscopic thermal neutron capture cross-section of the formation.

8. The method of claim 7, further including the step of:

obtaining the porosity of the formation from the quantitative estimate of element composition and the known macroscopic thermal neutron capture cross-section of the earth formation.

9. The method of claim 7, further including the step of:

obtaining the salinity of water in the earth formation from the quantitative measure of element composition and the known macroscopic thermal neutron capture cross-section of the earth formation.

10. The method of claim 7, further including the step of:

obtaining the volume fractions of formation constituents of the earth formation from the quantitative measure of element composition and the known macroscopic thermal neutron capture cross-section of the earth formation.

11. The method of claim 7, further including the step of:

obtaining the ratios of formation constituents of the earth formation from the quantitative measure of element composition and the known macroscopic thermal neutron capture cross-section of the earth formation.

12. The method of claim 7, wherein:

a. said step of obtaining gamma ray spectra of unknown materials comprises the step of obtaining formation gamma ray spectra for plural depths in the borehole; and b. said step of comparing comprises the step of comparing gamma ray spectra of unknown materials for each of plural depths in the borehole with the standard spectra; and c. said step of obtaining the water saturation of the formation comprises the step of obtaining the water saturation of the earth formations at plural depths in the borehole.

13. The method of claim 12, and furhter including the steps of:

a. selecting a depth in the borehole as being water saturated based on the water saturation value obtained during said step of deriving water saturation; and b. obtaining enhanced water saturation values for other depths of the borehole based on the water saturation value at the selected depths.

14. The method of claim 12, and further including the steps of:

a. selecting a depth in the borehole as being water saturated based on the water saturation value obtained during said step of deriving water saturation; and b. obtaining enhanced salinity values for other depths of the borehole based on the water saturation value at the selected depth.

15. The method of claim 12, and further including the steps of:

a. selecting a depth in the borehole as being water saturated based on the water saturation value obtained during said step of deriving water saturation; and b. obtaining enhanced porosity values for other depths of the borehole based on the water saturation value at the selected depth.

16. The method of claim 12, and further including the steps of:

a. selecting a depth in the borehole as being water saturated based on the water saturation value obtained during said step of deriving water saturation; and b. obtaining enhanced volume fractions of formation constituents for other depths of the borehole based on the water saturation value at the selected depth.

17. The method of claim 12, and further including the steps of:

a. selecting a depth in the borehole as being water saturated based on the water saturation value obtained during said step of deriving water saturation; and b. obtaining enhanced ratios of formation components for other depths of the borehole based on the water saturation value at the selected depth.

18. The method of claim 7, further including the step of:

forming a record of water saturation as a function of borehole depth.

19. A method for analysis of earth formations surrounding a well borehole wherein the macroscopic thermal neutron capture cross-section of the formations is known, comprising the steps of:

a. obtaining standard gamma ray energy spectra of materials postulated to be in formations surrounding a well borehole;

b. bombarding the earth formations in the vicinity of the borehole with fast neutrons which are slowed down and thereafter engage in neutron capture reactions with materials in the vicinity of the borehole;

c. obtaining gamma ray energy spectra of unknown materials surrounding the well borehole;

d. comparing an unknown gamma ray spectrum with a composite weighted mixture of the standard gamma ray spectra to obtain therefrom a quantitative measure of the percentage composition of elements in the vicinity of the borehole; and e. obtaining the salinity of water in the earth formation from the quantitative measure of percentage composition of elements and the known macroscopic thermal neutron capture cross-section of the formation.

20. The method of claim 19, further including the step of:

obtaining the porosity of the formation from the quantitative estimate of element composition and the known macroscopic thermal neutron capture cross-section of the earth formation.

21. The method of claim 19, further including the step of:
obtaining the volume fractions of formation constituents of the earth formation from the quantitative measure of element composition and the known macroscopic thermal neutron capture cross-section of the earth formation.

22. The method of claim 19, further including the step of:
obtaining the ratios of formation constituents of the earth formation from the quantitative measure of element composition and the known macroscopic thermal neutron capture cross-section of the earth formation.

23. The method of claim 19, wherein:
a. said step of obtaining gamma ray spectra of unknown materials comprises the step of obtaining formation gamma ray spectra for plural depths in the borehole; and
b. said step of comparing comprises the step of comparing gamma ray spectra of unknown materials for each of plural depths in the borehole with the standard spectra; and
c. said step of obtaining the salinity of water in the formation comprises the step of obtaining the salinity of water in the earth formations at plural depths in the borehole.

24. The method of claim 19, further including the step of:
forming a record of formation water salinity as a function of borehole depth.

25. A method for analysis of earth formations surrounding a well borehole wherein the macroscopic thermal neutron capture cross-section of the formations is known, comprising the steps of:
a. obtaining standard gamma ray energy spectra of materials postulated to be in formations surrounding a well borehole;
b. bombarding the earth formations in the vicinity of the borehole with fast neutrons which are slowed down and thereafter engage in neutron capture reactions with materials in the vicinity of the borehole;
c. obtaining gamma ray energy spectra of unknown materials surrounding the well borehole;
d. comparing an unknown gamma ray spectrum with a composite weighted mixture of the standard gamma ray spectra to obtain therefrom a quantitative measure of the percentage composition of elements in the vicinity of the borehole; and
e. obtaining the volume fractions of formation constituents in the earth formation from the quantitative measure of percentage composition of elements and the known macroscopic thermal neutron capture cross-section of the formation.

26. The method of claim 25, further including the step of:
obtaining the porosity of the formation from the quantitative estimate of element composition and the known macroscopic thermal neutron capture cross-section of the earth formation.

27. The method of claim 25, further including the step of:
obtaining the ratios of formation constituents of the earth formation from the quantitative measure of element composition and the known macroscopic thermal neutron capture cross-section of the earth formation.

28. The method of claim 25, wherein:
a. said step of obtaining gamma ray spectra of unknown materials comprises the step of obtaining formation gamma ray spectra for plural depths in the borehole; and
b. said step of comparing comprises the step of comparing gamma ray spectra of unknown materials for each of plural depths in the borehole with the standard spectra; and
c. said step of obtaining the volume fractions of formation constituents of the formation comprises the step of obtaining the volume fractions of formation constituents of the earth formations at plural depths in the borehole.

29. The method of claim 25, further including the step of:
forming a record of the volume fractions of formation constituents as a function of borehole depth.

30. A method for analysis of earth formations surrounding a well borehole wherein the macroscopic thermal neutron capture cross-section of the formations is known, comprising the steps of:
a. obtaining standard gamma ray energy spectra of materials postulated to be in formations surrounding a well borehole;
b. bombarding the earth formations in the vicinity of the borehole with fast neutrons which are slowed down and thereafter engage in neutron capture reactions with materials in the vicinity of the borehole;
c. obtaining gamma ray energy spectra of unknown materials surrounding the well borehole;
d. comparing an unknown gamma ray spectrum with a composite weighted mixture of the standard gamma ray spectra to obtain therefrom a quantitative measure of the percentage composition of elements in the vicinity of the borehole; and
e. obtaining the porosity of the earth formation from the quantitative measure of percentage composition of elements and the known macroscopic thermal neutron capture cross-section of the formation.

31. The method of claim 30, further including the step of:
obtaining the ratios of formation constituents of the earth formation from the quantitative measure of element composition and the known macroscopic thermal neutron capture cross-section of the earth formation.

32. The method of claim 30, wherein:
a. said step of obtaining gamma ray spectra of unknown materials comprises the step of obtaining formation gamma ray spectra for plural depths in the borehole;
b. said step of comparing comprises the step of comparing gamma ray spectra of unknown materials for each of plural depths in the borehole with the standard spectra; and
c. said step of obtaining the porosity of the formation comprises the step of obtaining the porosity of the earth formations at plural depths in the borehole.

33. The method of claim 30, further including the step of:
forming a record of porosity as a function of borehole depth.

34. A method for analysis of earth formations surrounding a well borehole wherein the macroscopic thermal neutron capture cross-section of the formations is known, comprising the steps of:
  a. obtaining standard gamma ray energy spectra of materials postulated to be in formations surrounding a well borehole;
  b. bombarding the earth formations in the vicinity of the borehole with fast neutrons which are slowed down and thereafter engage in neutron capture reactions with materials in the vicinity of the borehole;
  c. obtaining gamma ray energy spectra of unknown materials surrounding the well borehole;
  d. comparing an unknown gamma ray spectrum with a composite weighted mixture of the standard gamma ray spectra to obtain therefrom a quantitative measure of the percentage composition of elements in the vicinity of the borehole; and
  e. obtaining the ratios of formation constituents of the earth formation from the quantitative measure of percentage composition of elements and the known macroscopic thermal neutron capture cross-section of the formation.

35. The method of claim 34, wherein:
  a. said step of obtaining gamma ray spectra of unknown materials comprises the step of obtaining formation gamma ray spectra for plural depths in the borehole; and
  b. said step of comparing comprises the step of comparing gamma ray spectra of unknown materials for each of plural depths in the borehole with the standard spectra; and
  c. said step of obtaining the ratios of formation constituents of the formation comprises the step of obtaining the ratios of formation constituents of the earth formations at plural depths in the borehole.

36. The method of claim 34, further including the step of:
  forming a record of ratios as a function of borehole depth.

37. An automated data processing machine for analyzing earth formations surrounding a well borehole based on standard gamma ray spectra of materials postulated to be in the formation, gamma ray spectra of unknown materials surrounding the well borehole and the known macroscopic thermal neutron capture cross-section of the formation, comprising:
  a. means for comparing an unknown gamma ray spectrum with a composite weighted mixture of the standard gamma ray spectra to obtain therefrom a quantitative measure of the percentage composition of elements in the vicinity of the borehole; and
  b. means for obtaining quantitatively the primary formation parameters of the formation from the quantitative measure of percentage composition of elements and the known macroscopic thermal neutron capture cross-section of the formation.

38. An automated data processing machine for analyzing earth formations surrounding a well borehole based on standard gamma ray spectra of materials postulated to be in the formation, gamma ray spectra of unknown materials surrounding the well borehole and the known macroscopic thermal neutron capture cross-section of the formation, comprising:
  a. means for comparing an unknown gamma ray spectrum with a composite weighted mixture of the standard gamma ray spectra to obtain therefrom a quantitative measure of the percentage composition of elements in the vicinity of the borehole; and
  b. means for obtaining the water saturation of the earth formation from the quantitative measure of percentage composition of elements and the known macroscopic thermal neutron capture cross-section of the formation.

39. The machine of claim 38, further including:
  means for obtaining the porosity of the formation from the quantitative estimate of element composition and the known macroscopic thermal neutron capture cross-section of the earth formation.

40. The machine for claim 38, further including:
  means for obtaining the salinity of water in the earth formation from the quantitative measure of element composition and the known macroscopic thermal neutron capture cross-section of the earth formation.

41. The machine for claim 38, further including:
  means for obtaining the volume fractions of formation constituents of the earth formation from the quantitative measure of element composition and the known macroscopic thermal neutron capture cross-section of the earth formation.

42. The machine of claim 38, wherein said means for comparing comprises:
  means for obtaining the ratios of formation constituents of the earth formation from the quantitative measure of element composition and the known macroscopic thermal neutron capture cross-section of the earth formation.

43. An automated data processing machine for analyzing earth formations surrounding a well borehole based on standard gamma ray spectra of materials postulated to be in the formation, gamma ray spectra of unknown materials surrounding the well borehole and the known macroscopic thermal neutron capture cross-section of the formation, comprising:
  a. means for comparing an unknown gamma ray spectrum with a composite weighted mixture of the standard gamma ray spectra to obtain therefrom a quantitative measure of the percentage composition of elements in the vicinity of the borehole; and
  b. means for obtaining the salinity of water in the earth formation from the quantitative measure of percentage composition of elements and the known macroscopic thermal neutron capture cross-section of the formation.

44. The machine of claim 43, further including:
  means for obtaining the porosity of the formation from the quantitative estimate of element composition and the known macroscopic cross-section of the earth formation.

45. The machine of claim 43, further including:
  means for obtaining the volume fractions of formation constituents of the earth formation from the quantitative measure of element composition and the known macroscopic thermal neutron capture cross-section of the earth formation.

46. The machine of claim 43, further including:
  means for obtaining the ratios of formation constituents of the earth formation from the quantitative measure of element composition and the known macroscopic thermal neutron capture cross-section of the earth formation.

47. An automated data processing machine for analyzing earth formations surrounding a well borehole based on standard gamma ray spectra of materials postulated to be in the formation, gamma ray spectra of unknown materials surrounding the well borehole and the known macroscopic thermal neutron capture cross-section of the formation, comprising:
- a. means for comparing an unknown gamma ray spectrum with a composite weighted mixture of the standard gamma ray spectra to obtain therefrom a quantitative measure of the percentage composition of elements in the vicinity of the borehole; and
- b. means for obtaining the volume fractions of formation constituents in the earth formation from the quantitative measure of percentage composition of elements and the known macroscopic thermal neutron capture cross-section of the formation.

48. The machine of claim 47, further including:
means for obtaining the porosity of the formation from the quantitative estimate of element composition and the known macroscopic thermal neutron capture cross-section of the earth formation.

49. The machine of claim 47, further including:
means for obtaining the ratios of formation constituents of the earth formation from the quantitative measure of element composition and the known macroscopic thermal neutron capture cross-section of the earth formation.

50. An automated data processing machine for analyzing earth formations surrounding a well borehole based on standard gamma ray spectra of materials postulated to be in the formation, gamma ray spectra of unknown materials surrounding the well borehole and the known macroscopic thermal neutron capture cross-section of the formation, comprising:
- a. means for comparing an unknown gamma ray spectrum with a composite weighted mixture of the standard gamma ray spectra to obtain therefrom a quantitative measure of the percentage composition of elements in the vicinity of the borehole; and
- b. means for obtaining the porosity in the earth formation from the quantitative measure of percentage composition of elements and the known macroscopic thermal neutron capture cross-section of the formation.

51. The machine of claim 50, further including:
means for obtaining the ratios of formation constituents of the earth formation from the quantitative measure of element composition and the known macroscopic thermal neutron capture cross-section of the earth formation.

52. An automated data processing machine for analyzing earth formations surrounding a well borehole based on standard gamma ray spectra of materials postulated to be in the formation, gamma ray spectra of unknown materials surrounding the well borehole and the known macroscopic thermal neutron capture cross-section of the formation, comprising:
- a. means for comparing an unknown gamma ray spectrum with a composite weighted mixture of the standard gamma ray spectra to obtain therefrom a quantitative measure of the percentage composition of elements in the vicinity of the borehole; and
- b. means for obtaining the ratios of formation constituents in the earth formation from the quantitative measure of percentage composition of elements and the known macroscopic thermal neutron capture cross-section of the formation.

* * * * *

UNITED STATES PATENT OFFICE
CERTIFICATE OF CORRECTION

PATENT NO. : 3,930,153

DATED : July 18, 1975

INVENTOR(S) : Hubert D. Scott

Page 1 of 8

It is certified that error appears in the above-identified patent and that said Letters Patent are hereby corrected as shown below:

Column 2, line 34, reading "unknwon" should be --unknown--.

Column 8, line 17, reading "cros-ssection" should be --cross-section--.

UNITED STATES PATENT OFFICE
CERTIFICATE OF CORRECTION

PATENT NO. : 3,930,153
DATED : July 18, 1975
INVENTOR(S) : Hubert D. Scott

Page 2 of 8

It is certified that error appears in the above-identified patent and that said Letters Patent are hereby corrected as shown below:

Column 9, line 34, please delete formula 8 and substitute therefor the following:

$$\frac{dN_s(t)}{dt} = \lambda_1 N_{of} \delta t \, e^{-\lambda_1 t} - \lambda N_s(t)$$

Column 9, line 39, please delete formula 9 and substitute therefor the following:

$$N_s(t) = \frac{\lambda_1}{\lambda - \lambda_1} N_{of} \delta t \, (e^{-\lambda_1 t} - e^{-\lambda t})$$

Column 9, line 49, please delete formula 10 and substitute therefor the following:

$$N(t) = \int_{t-\Delta t}^{t} \frac{\lambda_1}{\lambda - \lambda_1} N_{of} \, (e^{-\lambda_1 t} - e^{-\lambda t}) \, dt$$

Column 9, line 57, please delete formula 11 and substitute therefor the following:

$$N(t) = \frac{\lambda_1}{\lambda - \lambda_1} N_{of} \left[ -\frac{1}{\lambda_1} e^{-\lambda_1 t} (1 - e^{\lambda_1 \Delta t}) + \frac{1}{\lambda} e^{-\lambda t} (1 - e^{\lambda \Delta t}) \right].$$

UNITED STATES PATENT OFFICE
CERTIFICATE OF CORRECTION

PATENT NO. : 3,930,153
DATED : July 18, 1975
INVENTOR(S) : Hubert D. Scott

Page 3 of 8

It is certified that error appears in the above-identified patent and that said Letters Patent are hereby corrected as shown below:

Column 10, lines 6, 7 and 8, please delete formula 13 and substitute therefor the following:

$$\gamma(t_2 \rightarrow t_3) = \frac{\lambda \lambda_1}{\lambda - \lambda_1} N_{of} \left[ \frac{1}{\lambda_1^2} (e^{-\lambda_1 t_3} - e^{-\lambda_1 t_2})(1 - e^{\lambda_1 t_1}) - \frac{1}{\lambda^2} (e^{-\lambda t_3} - e^{-\lambda t_2})(1 - e^{\lambda t_1}) \right]$$

Column 10, line 15, please delete formula 14 and substitute therefor the following:

$$\gamma(t_2 \rightarrow t_3) = \frac{N_{of}}{(\tau - \tau_1)} \left[ \tau^2 (e^{-\frac{t_2}{\tau}} - e^{-\frac{t_3}{\tau}})(e^{\frac{t_1}{\tau}} - 1) - \tau_1^2 (e^{-\frac{t_2}{\tau_1}} - e^{-\frac{t_3}{\tau_1}})(e^{\frac{t_1}{\tau_1}} - 1) \right] \quad (14)$$

Column 10, line 25, please delete formula 15 and substitute therefor the following:

$$f(\Sigma) = \gamma(t_2 \rightarrow t_3) = \frac{N_{of}}{(\tau - \tau_1)} \left[ \tau^2 (e^{-\frac{t_2}{\tau}} - e^{-\frac{t_3}{\tau}})(e^{\frac{t_1}{\tau}} - 1) \right]$$

Column 10, line 40, please delete formula 16 and substitute therefor the following:

$$(e^{\frac{t_1}{\tau}} - 1) \approx \frac{t_1}{\tau}$$

UNITED STATES PATENT OFFICE
CERTIFICATE OF CORRECTION

PATENT NO. : 3,930,153
DATED : July 18, 1975
INVENTOR(S) : Hubert D. Scott

It is certified that error appears in the above-identified patent and that said Letters Patent are hereby corrected as shown below:

Column 10, line 55, reading "at 2 and 3 and" should be --at $2_\tau$ and $3_\tau$ and--.

UNITED STATES PATENT OFFICE
CERTIFICATE OF CORRECTION

PATENT NO. : 3,930,153

DATED : July 18, 1975

INVENTOR(S) : Hubert D. Scott

Page 5 of 8

It is certified that error appears in the above-identified patent and that said Letters Patent are hereby corrected as shown below:

Column 10, line 49, please delete formula 17 and substitute therefor the following:

$$f(\Sigma) = \gamma_{SB}(t_2 \rightarrow t_3) = N_{of}\left(e^{-\frac{t_2}{\tau}} - e^{-\frac{t_3}{\tau}}\right) \cdot t_1$$

Column 11, line 1, please delete formula 19 and substitute therefor the following:

$$f(\Sigma) = N_{of}\left(e^{-\frac{t_2}{\tau}} - e^{-\frac{t_3}{\tau}}\right) \cdot t_1 + N_{of}\left(e^{-\frac{t_4}{\tau}} - e^{-\frac{t_5}{\tau}}\right) \cdot t_1$$

UNITED STATES PATENT OFFICE
CERTIFICATE OF CORRECTION

PATENT NO. : 3,930,153

DATED : July 18, 1975

INVENTOR(S) : Hubert D. Scott

Page 6 of 8

It is certified that error appears in the above—identified patent and that said Letters Patent are hereby corrected as shown below:

Column 14, line 30, formula 39A reading in part:

" $= 22.1 \ \phi 1[1 + S_w \{1 - S(\rho_{slc} -1\}$, should be

-- $= 22.1 \ \phi[1 + S_w [(1 - S)]\rho_{sw} - 1\}]$--.

Column 15, line 70, formula 52 reading in part:

"$[1 + S_w \ 1 - S(\rho_{sw} - 1) \ ]$" should be

--$[1 + S_w \{1 - S (\rho_{sw} - 1)\} \ ]$--.

UNITED STATES PATENT OFFICE
CERTIFICATE OF CORRECTION

PATENT NO. : 3,930,153

DATED : July 18, 1975

INVENTOR(S) : Hubert D. Scott

Page 7 of 8

It is certified that error appears in the above-identified patent and that said Letters Patent are hereby corrected as shown below:

Column 16, line 5, formula #53 reading in part:

"$S = \dfrac{(1 + S_w - S_w)}{S_w}$" should be $$-- S = \dfrac{(1 + S_w \rho_{sw} - S_w)}{S_w \rho_{sw}} --$$

Column 16, line 19, formula #54 reading in part:

"$\dfrac{.00294}{G_{Cl} \phi S_w}$" should be $-- \dfrac{.00294}{G_{Cl} \phi S_w \rho_{sw}} --$ Column 17, line 44, equation #60 reading in part:

"$V_{S10_2}$" should be $--V_{SiO_2}--$.

Column 19, line 20 reading "functions" should be --formations--.

Column 19, line 32 reading "sand to" should be --sand can--.

UNITED STATES PATENT OFFICE
CERTIFICATE OF CORRECTION

PATENT NO. : 3,930,153
DATED : July 18, 1975
INVENTOR(S) : Hubert D. Scott

It is certified that error appears in the above-identified patent and that said Letters Patent are hereby corrected as shown below:

Column 27, line 58, Claim 13 reading "furhter" should be --further--.

Column 30, Claim 32, line 54 reading "the borehole;" should be --the borehole; and--.

Signed and Sealed this

Twenty-seventh Day of July 1976

[SEAL]

Attest:

RUTH C. MASON
Attesting Officer

C. MARSHALL DANN
Commissioner of Patents and Trademarks